United States Patent
Zabian et al.

(10) Patent No.: US 10,586,264 B2
(45) Date of Patent: Mar. 10, 2020

(54) SYSTEMS FOR ELECTRONIC EXCHANGE OF INFORMATION ABOUT AVAILABLE ITEMS

(71) Applicant: Dubizzle Middle East FZ-LLC, Dubai (AE)

(72) Inventors: Tariq Zabian, Ontario (CA); Mohamed Imran, Los Angeles, CA (US); Alexander James Benjamin Hutley, Cobham (GB)

(73) Assignee: Dubizzle Middle East FZ-LLC, Dubai (AE)

( * ) Notice: Subject to any disclaimer, the term of this patent is extended or adjusted under 35 U.S.C. 154(b) by 515 days.

(21) Appl. No.: 15/317,809

(22) PCT Filed: Jun. 17, 2015

(86) PCT No.: PCT/IB2015/054573
§ 371 (c)(1),
(2) Date: Dec. 9, 2016

(87) PCT Pub. No.: WO2015/193827
PCT Pub. Date: Dec. 23, 2015

(65) Prior Publication Data
US 2017/0109804 A1    Apr. 20, 2017

(30) Foreign Application Priority Data
Jun. 18, 2014   (ZA) .................................. 2014/04453

(51) Int. Cl.
*G06Q 30/00* (2012.01)
*G06Q 30/06* (2012.01)
(Continued)

(52) U.S. Cl.
CPC .......... *G06Q 30/0625* (2013.01); *G06F 16/22* (2019.01); *G06Q 30/06* (2013.01); *G06Q 30/0643* (2013.01); *H04L 67/18* (2013.01)

(58) Field of Classification Search
CPC ............... G06Q 30/06; G06Q 30/0625; G06Q 30/0643; G06F 16/22; H04L 67/18
See application file for complete search history.

(56) References Cited

U.S. PATENT DOCUMENTS 6,243,723 B1    6/2001  Ikeda et al.
7,831,582 B1   11/2010  Scofield et al.
(Continued)

OTHER PUBLICATIONS

Lipyeow Lim et al. "Managing E-Commerce Catalogs in a DBMS with Native XML Support", Proceedings of the 2005 IEEE International Conference on e-Business Engineering (ICEBE'05) (Year: 2005).*

(Continued)

*Primary Examiner* — Naeem U Haq
(74) *Attorney, Agent, or Firm* — Fenwick & West LLP

(57) ABSTRACT

Systems and methods for exchanging information about available items are provided. A method that can be performed at a server system includes: receiving media content relating to an available item from an electronic device of a listing user; receiving one or more keyword attributes that define attributes of the available item, the keyword attributes being generated by the listing user; and receiving location data identifying the location of the available item. The method stores the media content, keyword attributes, and the location data of the available item as an item record in an item database. Responsive to an accessing user accessing the server system using an electronic device, the method enables the accessing user to filter item records stored in the item database by the keyword attributes so as to view available items that match the keyword attributes.

20 Claims, 17 Drawing Sheets

(51) Int. Cl.
*G06F 16/22* (2019.01)
*H04L 29/08* (2006.01)

(56) References Cited

U.S. PATENT DOCUMENTS

| | | |
|---|---|---|
| 8,463,658 B2 | 6/2013 | Racco |
| 2007/0143312 A1 | 6/2007 | Wiseman |
| 2007/0219858 A1 | 9/2007 | Seymour et al. |
| 2008/0189307 A1 | 8/2008 | Sankaran et al. |
| 2013/0218912 A1 | 8/2013 | Howard et al. |
| 2014/0067603 A1 | 3/2014 | Okoro et al. |
| 2014/0279217 A1* | 9/2014 | Stover ............... G06Q 30/0633 705/26.8 |

OTHER PUBLICATIONS

Patent Cooperation Treaty, International Search Report, International Patent Application No. PCT/IB2015/054573, dated Oct. 7, 2015, 4 Pages.

Patent Cooperation Treaty, Written Opinion of the International Searching Authority, International Patent Application No. PCT/IB2015/054573, dated Oct. 7, 2015, 6 Pages.

* cited by examiner

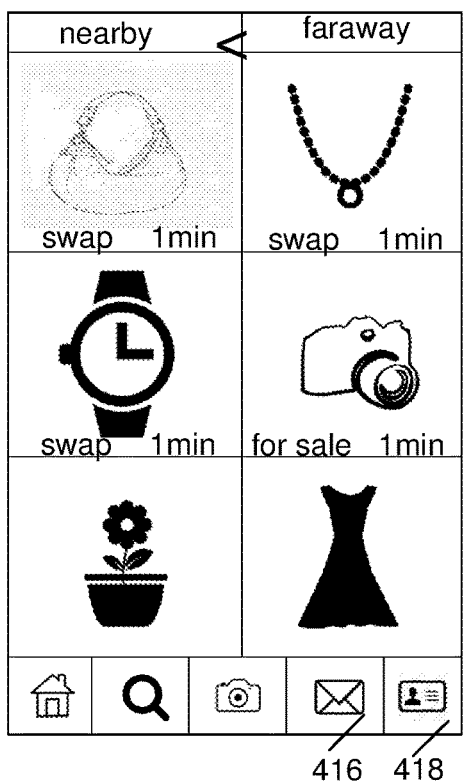
Figure 12A
Figure 12B
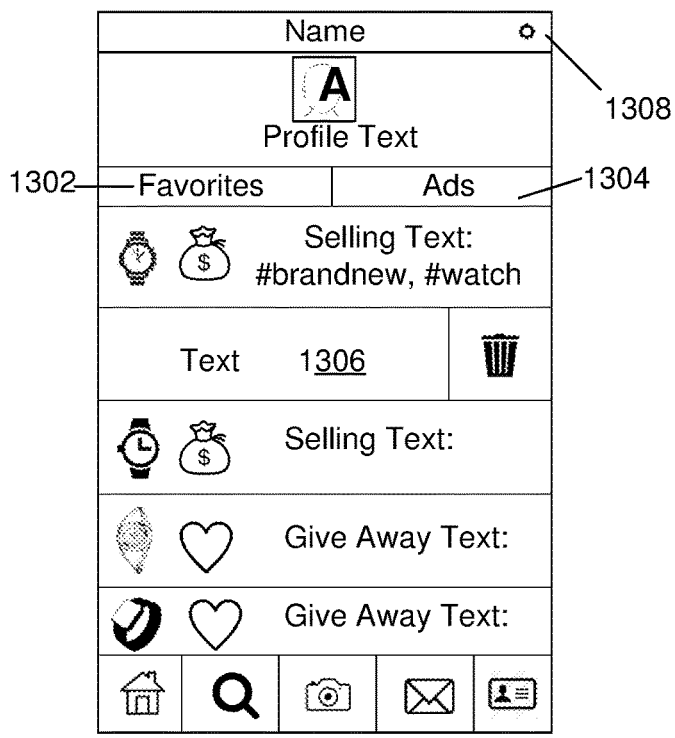
Figure 13
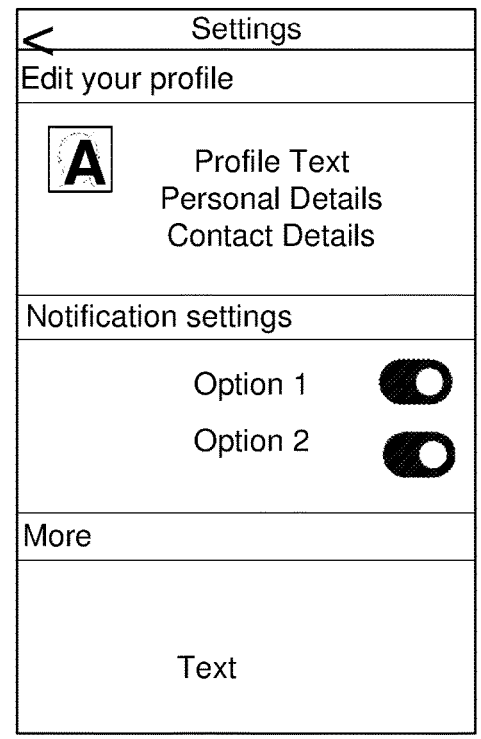
Figure 14

SYSTEMS FOR ELECTRONIC EXCHANGE OF INFORMATION ABOUT AVAILABLE ITEMS

CROSS-REFERENCE TO RELATED APPLICATIONS

This application is a 35 U.S.C. 371 national stage filing of International Application No. PCT/IB2015/054573, filed on 17 Jun. 2015, which claims priority to South African provisional patent application number 2014/04453 filed on 18 Jun. 2014 which are incorporated by reference herein.

FIELD OF THE INVENTION

The technology described in this application relates to electronic computer-implemented systems and methods for the exchange of information about available items.

BACKGROUND TO THE INVENTION

The Internet has changed the way that people interact, purchase things and find information.

One type of information which users are often interested in is products or services which may be offered by other users in a community or area. Classified advertising is a form of advertising in which a short description of a product or service may be published in an appropriate forum, which may be a newspaper, periodical or online by means of the World Wide Web. Classified advertisements are user-generated, and the publisher of the advertisements is typically not involved in the generation of an advertisement beyond vetting it for content or suitability. Most often, the publisher is also not involved in the transaction which occurs between an advertising user and a consuming user. The publisher therefore basically acts as a bulletin board for the user-generated advertisements.

In traditional classified advertisements in newspapers or paper journals, users may be charged a fee to place an advertisement. For online classified systems, the low cost of publication makes free classified advertising possible, and the operator of the online classified system can generate revenue through display advertising, sponsored links, and paid-for promotion of selected advertisements. Online classified systems allow users to list, read and respond to classified advertisements through the Internet. An example of a popular online classified system is Craigslist™.

As the word "classified" suggests, classified advertisements are classified at the time of being generated by selecting a number of predefined categories into which the advertisement fits. For example, in the case of an online classified system, an advertising user is required to identify one or more categories or attributes of an advertised product or service from a long list which may start with the type of product or service offered—such as furniture, motor vehicles, jobs offered, property to rent and so forth—and also include many other requested details such as the price, location, make, model, color, etc. A user posting an advertisement is typically prompted by the online classified system to complete a form or series of forms with lists of requested information and select from these predefined categories. This requires many interactions from the user which can be time-consuming and consequently a potential deterrent to placing an online classified advertisement, particularly for lower value items. Users placing an advertisement may also be frustrated if the categories they wish to identify a product or service with do not exist, or a product or service spans multiple categories and the system only allows certain categories to be selected. For example, a user may be unsure whether a mobile smart device should be listed under "computers" or "mobile phones".

From the perspective of a user browsing classified advertisements, the majority of existing online classified systems require that the consumer identify specific categories or keywords to search. Existing systems may not provide an intuitive means for users to view or browse available items without specifying the type of product or service they are looking for. Consumers therefore generally only visit online classified websites when they have a specific need for an item.

The technology of this invention aims to address these and other problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

The technology described herein enables a method for exchanging information about available items that can be performed at a server system, comprising:
  receiving media content relating to an available item from an electronic device of a listing user;
  receiving one or more keyword attributes that define attributes of the available item, the keyword attributes being generated by the listing user;
  receiving location data identifying the location of the available item;
  storing the media content, keyword attributes, and the location data of the available item as an item record in an item database; and
  responsive to an accessing user accessing the server system using an electronic device, enabling the accessing user to filter item records stored in the item database by the keyword attributes so as to view available items that match the keyword attributes, and enabling the accessing user to filter item records based on a comparison between the location data of the available item and a location of the accessing user so as to indicate the proximity of the available item to the accessing user.

Further features of the technology provide for the item database to employ a database structure in which the item records are stored and categorized based on the user-generated keyword attributes without employing a pre-set or hierarchical classification database structure.

The step of receiving location data identifying the location of the available item preferably is generated by the electronic device of the listing user determining its current location, and storing the location data of the available item as part of the item record in the item database. Alternatively, a location of the available item may be provided by the listing user. The location of the accessing user may preferably be location data of the electronic device of the accessing user. Alternatively, the accessing user may provide an alternative location, such as a home or office location. Proximity may be calculated by the server system and presented to the accessing user as the time it would take the accessing user to travel to the available item.

Yet further features of the technology allow the steps of: receiving an item category selected by the listing user; the item category specifying a type of offer made by the listing user; storing the item category of the available item as part of the item record in the item database; and responsive to the accessing user accessing the server system, enabling the accessing user to filter item records based on the item category. In one embodiment, the item category is one of: an offer to sell, an offer to rent, an offer to swap, or an offer to give away.

Further features of the technology provide for an item record stored in the item database to be referenced, searched and accessed by any one or more of the group of: keyword attribute, location data, and item category.

Still further features of the technology allow the steps of: time stamping the item record at or close to the time at which the item record is stored in the item database; and responsive to the accessing user accessing the server system, enabling the accessing user to view item records in a chronological manner so that recently stored item records can be viewed first by the accessing user.

The media content of the item may be a digital photograph or digital video of an available item, and the photograph or video may be obtained from a built-in camera of the electronic device of the listing user.

The media content may include a description of the available item that may be a string of words describing the available item input by the listing user; and the keyword attributes may be selected words in the string of words. In one embodiment, the keyword attributes are selected within the string of words by a specific action performed or input provided by the user in relation to those keyword attributes. For example, the specific action may be a hashtag preceding each keyword attribute. The number of keyword attributes in the string of words may be limited, such as limited to no more than five keyword attributes.

Further features of the technology allow, responsive to individual characters of a keyword attribute being sequentially entered by the listing user, prompting the listing user with a dynamic list of keyword attributes previously selected by other listing users with the same starting characters, and enabling the listing user to select one of the keyword attributes previously selected by other listing users, or if none of the keyword attributes previously selected by other listing users are selected, enabling the listing user to create a new keyword attribute.

Further features of the technology provide for, in response to the listing user creating a new keyword attribute, storing the keyword attribute in a keyword attribute database and subsequently including the keyword attribute in the list of keyword attributes prompted to other listing users. In one embodiment, the keyword attribute database is entirely user-generated.

The item may be a product or service offered by the listing user to accessing users; and the electronic devices of the listing users and accessing users may be any portable or non-portable electronic device which has network connectivity including mobile devices such as mobile phones, tablet computers, laptops and the like, as well as desktop computers or other computer terminals. Of course, listing users may also be accessing users in respect of other listing users' items.

Further features of the technology allow the steps of: receiving a selection of an available item from an accessing user; and enabling the accessing user to comment on the available item, the comment then being associated with the available item and visible to all other accessing users. The technology may also allow the step of enabling the accessing user to commence a private conversation with the listing user.

The technology described herein extends to a method for exchanging information about available items that can be performed at an electronic device of a listing user and/or an accessing user, comprising:

receiving user input of media content relating to an available item;

receiving user input of one or more keyword attributes that define attributes of the available item, the keyword attributes being input by the listing user;

transmitting the media content and keyword attributes to a server system, the server system storing the media content and keyword attributes of the available item as an item record in an item database together with other previously listed items; and transmitting location data to the server system identifying the location of the available item, and the server system storing the location data in the item record.

Further features of the technology provide for the item database to employ a database structure in which the item records are stored and categorized based on the user-generated keyword attributes without employing a pre-set or hierarchical classification database structure.

Further features of the technology provide for the transmitted location data to be automatically generated by an electronic device of a listing user.

The technology further extends to inputting media content relating to an available item including: taking a digital photograph or digital video of an available item using a built-in camera of the electronic device of the listing user; and entering a description of the item.

Yet further features of the technology provide for the attributes to be identified by a specific action performed or input provided by the user in relation to the keywords; and for the specific action to be entering a hashtag preceding each keyword. In one embodiment, a user may be able to type a description which includes up to a certain number of attributes, such as up to five attributes.

Still further features of the technology include, responsive to individual characters of a keyword attribute being sequentially entered by the listing user, receiving from the server system a dynamic list of keyword attributes previously selected by other listing users with the same starting characters; and either selecting one of the keyword attributes displayed in the list, or if none of the keyword attributes previously selected by other listing users are selected, submitting a new keyword attribute to the server system, the server system storing the new keyword attribute on a keyword attribute database. In one embodiment, the keyword attribute database is entirely user-generated.

Further feature of the technology allow for the steps of: transmitting an item category selected by the listing user; the item category specifying a type of offer made by the listing user. In one embodiment, the item category is one of: an offer to sell, an offer to rent, an offer to swap, or an offer to give away.

Further features of the technology allow for the steps of: accessing the server system and receiving a number of item records; displaying the item records on a display of the electronic device; receiving user input to filter available items by one or more of the keyword attributes, the location of the available item and the item category; and in response to the user input, dynamically repopulating the display of the electronic device to display only those available items stored on the item database which match the location and/or keyword attributes and/or item categories specified by the user.

The technology further extends to a method for exchanging information about available items that can be performed at an electronic device of an accessing user, comprising: accessing a server system which has a plurality of item records stored on an item database, the item records including a description and depiction of an available item and a plurality of keywords that define attributes of the available item, the keywords attributes having been generated by other users; displaying at least the depiction of a number of available items on a display of the electronic device; receiving input from the accessing user to filter the displayed items by at least the keyword attributes; and in response to the user input, dynamically repopulating the display of the electronic device to display only those available items stored on the item database which match the keyword attributes specified by the accessing user.

Further features of the technology provide for the item database to employ a database structure in which the item records are stored and categorized based on the user-generated keyword attributes without employing a pre-set or hierarchical classification database structure.

The technology extends to a system for exchanging information about available items, the system comprising a server system having a processor and in communication with electronic devices of a plurality of users, the server system including:
  a receiving module for receiving media content relating to an available item from an electronic device of a listing user, and for receiving one or more keyword attributes that define attributes of the available item, the keyword attributes being generated by the listing user;
  a location module for receiving location data identifying the location of the available item;
  an item database module for storing the media content, keyword attributes, and location data of the available item as an item record;
  an accessing module for enabling an accessing user to access the server system using an electronic device; and
  a filtering module for enabling the accessing user to filter item records stored in the item database by the keyword attributes and/or location data so as to view available items that match the keyword attributes.

The technology yet further extends to a system for exchanging information about available items, the system comprising an electronic device having a processor and in communication with a server system, the electronic device including:
  an input receiving component for receiving user input of media content of an available item, and for receiving user input of one or more keyword attributes that define attributes of the available item;
  a transmitting component for transmitting the media content and keyword attributes to a server system, the server system storing the media content and keyword attributes of the available item as an item record in an item database together with other previously listed items;
  a location transmitting component for transmitting location data to the server system identifying the location of the available item, and the server system storing the location data in the item record and
  a displaying component for displaying at least the depiction of a number of available items on the electronic device.

The technology still further extends to a computer program product for exchanging information about available items, the computer program product comprising a computer-readable medium having stored computer-readable program code for performing the steps of:
  receiving media content relating to an available item from an electronic device of a listing user;
  receiving one or more keyword attributes that define attributes of the available item, the keyword attributes being generated by the listing user;
  receiving location data identifying the location of the available item;
  storing the media content, keyword attributes, and the location data of the available item as an item record in an item database; and
  responsive to an accessing user accessing the server system using an electronic device, enabling the accessing user to filter item records stored in the item database by the keyword attributes so as to view available items that match the keyword attributes, and enabling the accessing user to filter item records based on a comparison between the location data of the available item and a location of the accessing user so as to indicate the proximity of the available item to the accessing user.

The technology even further extends to a computer program product for exchanging information about available items, the computer program product comprising a computer-readable medium having stored computer-readable program code for performing the steps of:
  receiving user input of media content relating to an available item;
  receiving user input of one or more keyword attributes that define attributes of the available item, the keyword attributes being input by the listing user; and
  transmitting the media content and keyword attributes to a server system, the server system storing the media content and keyword attributes of the available item as an item record in an item database together with other previously listed items; and
  transmitting location data to the server system identifying the location of the available item, and the server system storing the location data in the item record.

The computer-readable medium may be a non-transitory computer-readable medium, the computer-readable program code being executable by a processing circuit.

BRIEF DESCRIPTION OF THE DRAWINGS

The invention will now be described, by way of example only, with reference to the accompanying representations in which:

FIGS. 12A and 12B are schematic diagrams of screen shots showing an exemplary user interface for a notification page according to the technology;

FIG. 13 is a schematic diagram of a screen shot showing an exemplary user interface for a profile page according to the technology;

FIG. 14 is a schematic diagram of a screen shot showing an exemplary user interface for a configuration page according to the technology;

DETAILED DESCRIPTION WITH REFERENCE TO THE DRAWINGS

In this specification the term "item" is intended to have a wide meaning and encompass any tangible or intangible thing or things, listing or information which may be offered by one user to another user, including all forms of products and services.

Figure 1A:
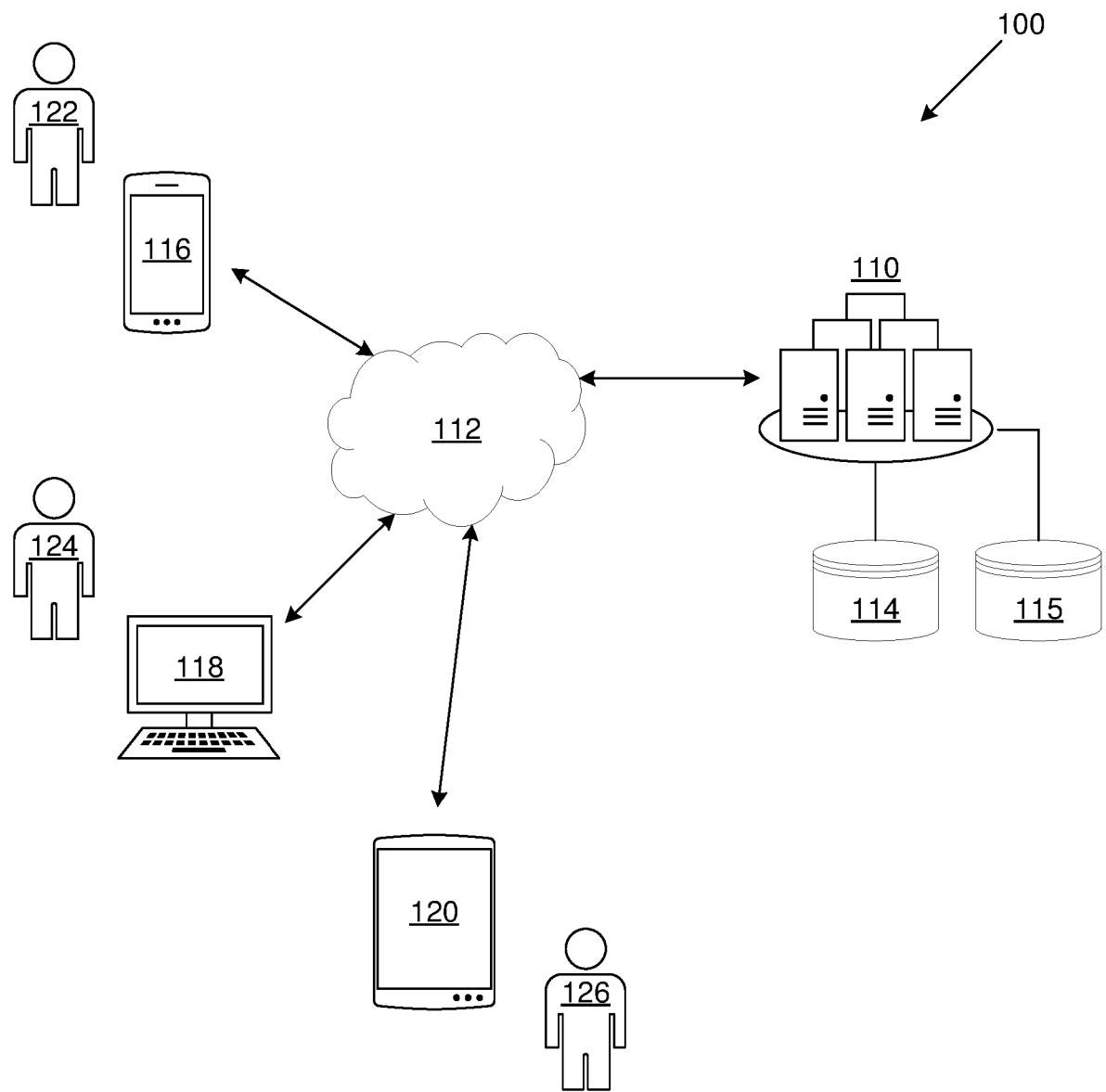
FIG. 1A is a schematic illustration of an embodiment of a system for exchanging information about available items according to the technology.

FIG. 1A illustrates an embodiment of a system (100) for exchanging information about available items according to the technology. The system (100) comprises a server system (110) which is in communication with a plurality of electronic devices through a communication network such as the Internet (112). The server system is coupled to an item database (114) and a keyword attribute database (115). While these are shown as logically separate, it will be appreciated that in physical form the item database and keyword attribute database are typically implemented in the same hardware device with shared portions of data structure.

In this embodiment, three electronic devices (116, 118, 120) are shown, each electronic device belonging to a corresponding user (122, 124, 126). The electronic devices may be mobile devices such as mobile phones, tablet computers and the like, or may be desktop computers or other computer terminals. Of course, although only three electronic devices are illustrated, in reality the system will include a plurality of electronic devices. In this description, the electronic device of the user will be described as a mobile phone having an installed mobile application thereon but it will be appreciated that the technology is not limited to such an application.

Figure 1B:
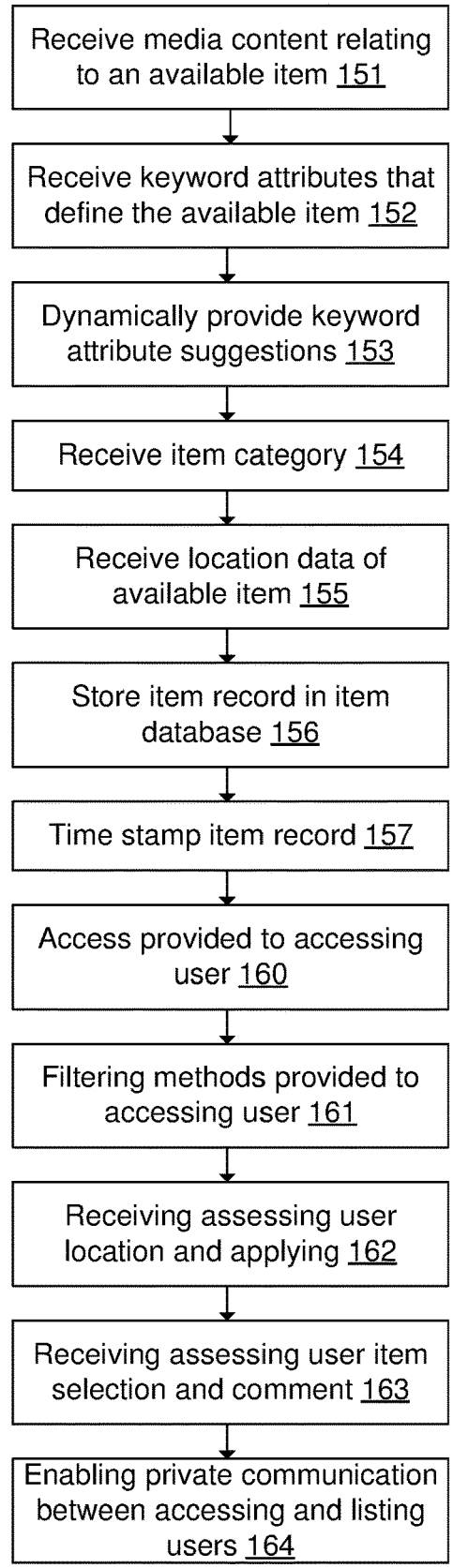
FIG. 1B is a flow diagram illustrating a method carried out at a server system according to the technology.

Referring to FIG. 1B, a flow diagram (150) illustrates an embodiment of a method carried out at the server system (110) for exchanging information about available items according to the technology.

The server system (110) may receive (151) media content relating to an available item from an electronic device of a listing user. The media content may include a description of the available item in the form of a string of words or text describing the available item. The media content relating to an available item may also include a depiction of the available item such as a digital photograph or digital video of the available item.

The method may include the server system (110) receiving (152) keyword attributes that define attributes of the available item. The keyword attributes may be generated by the listing user and received from the electronic device of the listing user.

The description of the media content which includes a string of words may include keyword attributes within the string of words. The keywords attributes may be words, abbreviations, combinations of words, or other keyword forms within or added to the string of words. The keywords may be selected within the string of words by a specific action performed or input provided by the user in relation to those keywords. For example, the specific action may be a hashtag preceding each keyword attribute. The number of keyword attributes in the string of words may be limited, such as limited to no more than five keyword attributes.

As the server system (110) receives (152) a part of the keyword attributes during input by the listing user, the server system may dynamically provide (153) a list of possible keyword attribute suggestions based on keyword attributes previously used by other listing users. The server system (110) may access and retrieve previously provided keywords from a keyword attribute database (115). This may be in response to individual characters of a keyword attribute being sequentially entered by the listing user, prompting the listing user with a dynamic list of keyword attributes previously selected by other listing users with the same starting characters. The listing user may select one of the keyword attributes previously selected by other listing users, or if none of the keyword attributes previously selected by other listing users are selected may create a new keyword attribute which may be added to the keyword attribute database (115) and subsequently including the keyword attribute in the list of keyword attributes prompted to other listing users. In one embodiment, the keyword attribute database (115) is entirely user-generated.

The server system (110) may also receive (154) an item category selected by the listing user specifying a type of offer made by the listing user for the available item. The item category is one of: an offer to sell, an offer to rent, an offer to swap, an offer to give away, or other disposal or trade of the item.

The server system (110) may receive (155) location data identifying the location of the available item. This may be provided in the background by a location service of the electronic device of the listing user. Alternatively, the location may be input by the listing user and may be a different location to the electronic device where the item itself is available.

The server system (110) may store (156) the media content, keyword attributes, item category, and the location data of the available item as an item record in an item database (114). The item database (114) may employ a database structure in which the item records are stored and categorized based on the user-generated keyword attributes without employing a pre-set or hierarchical classification database structure. The server system (110) may time stamp (157) an item record at or close to the time at which the item record is stored in the item database.

Access (160) to the item database (114) may be provided by the server system (110) to an electronic device of an accessing user. The location of the electronic device of an accessing user may be obtained (161) by the server system (110) when an accessing user accesses the item database in order to provide proximity information for available items. Alternatively, a location preferred by the accessing user may be provided as a basis for proximity calculations.

The server system (110) may provide various filtering methods (161) to enable the accessing user to filter item records. The filtering (161) may be based on by the keyword attributes so as to view available items that match the keyword attributes. The filtering (161) may also be based on a comparison between the location data of the available item and a location of the electronic device of the accessing user received (162) by the server system (110) so as to indicate the proximity of the available item to the accessing user. The proximity may be calculated by the server system (110) and presented to the accessing user as the time it would take the accessing user to travel to the available item based on a method of transport indicated by the accessing user. The filtering (161) may also be based on a category of available items. The filtering (161) may be a combination of these different methods.

The server system (110) may provide the accessing user with a view of item records in a chronological manner based on the time stamps of the item records so that recently stored item records can be viewed first by the accessing user.

The server system (110) may receive (163) a selection of an available item from an accessing user and may receive (164) a comment on the available item, the comment then being associated by the server system with the available item and visible to all other accessing users. The server system (110) may enable (164) the accessing user to commence a private conversation with the listing user via a communication technology of the server system (110).

Figure 1C:
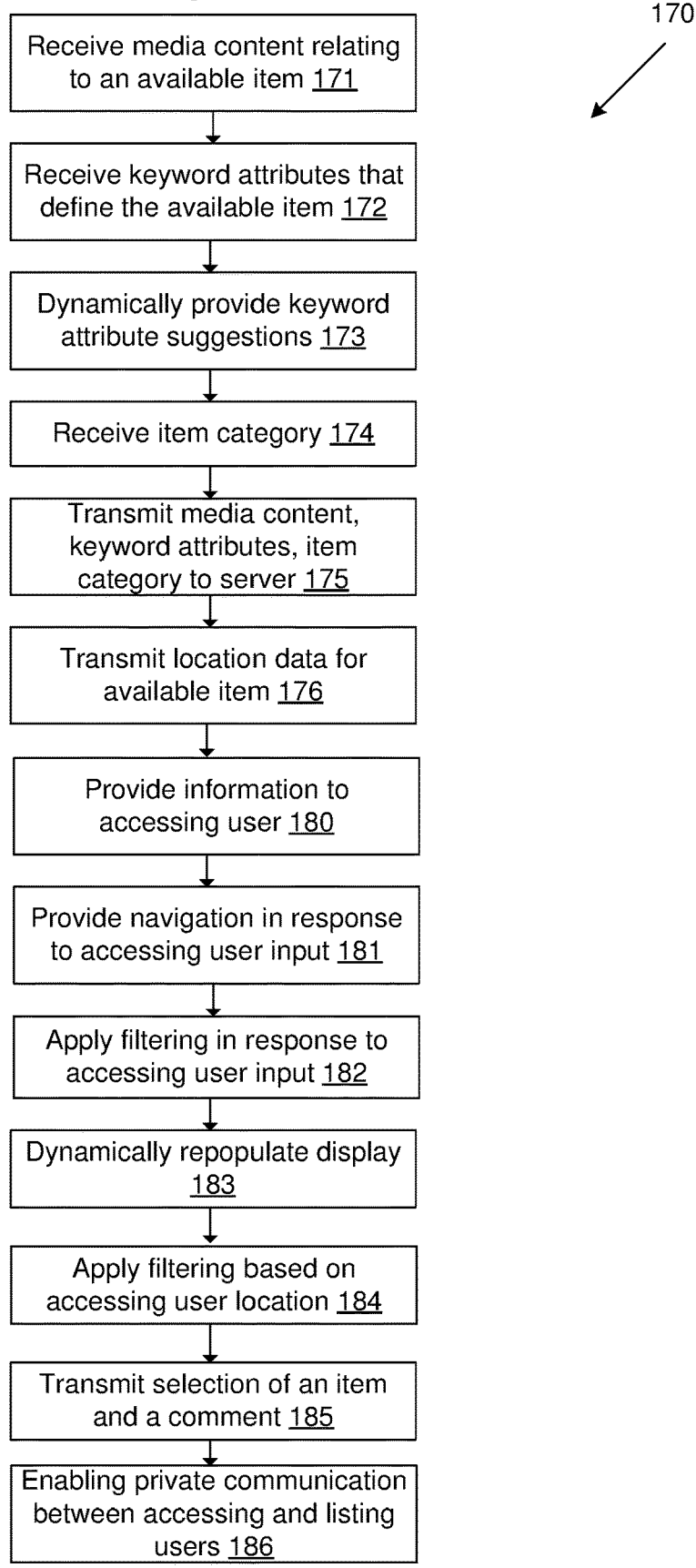
FIG. 1C is a flow diagram illustrating a method carried out at an electronic device according to the technology.

Referring to FIG. 1C, a flow diagram (170) illustrates an embodiment of a method carried out at an electronic device (116) for exchanging information about available items according to the technology.

The item may be a product or service offered by the listing user to accessing users and the electronic devices of the listing users and accessing users may be any portable or non-portable electronic device which has network connectivity including mobile devices such as mobile phones, tablet computers, laptops and the like, as well as desktop computers or other computer terminals. Of course, listing users may also be accessing users in respect of other listing users' items.

The described method may be provided by an application or software program executing on the electronic device or accessed via a browser of the electronic device. A user interface may be provided for input and navigation of the information provided by the server system including access to the item database.

A user interface of an electronic device as presented to a listing user may receive (171) media content relating to an available item. The media content may include a description of the available item in the form of a string of words or text describing the available item which may be typed into the user interface by a listing user. The media content relating to an available item may also include a depiction of the available item, for example, in the form of a digital photograph or digital video of the available item. A digital photograph or digital video of an available item may be taken using a built-in camera of the electronic device of the listing user or may be accessed from a local or remote media storage of the electronic device.

The user interface of the electronic device may receive (172) user input of one or more keyword attributes that define attributes of the available item. The keyword attributes are input by the listing user. The description of the media content which includes a string of words may include keyword attributes within the string of words. The keywords attributes may be words, abbreviations, combinations of words, or other keyword forms within or added to the string of words. The keyword attributes may be identified by a specific action performed or input provided by the user in relation to the keywords, such as entering a hashtag preceding each keyword. In one embodiment, a user may be able to type a description which includes up to a certain number of attributes, such as up to five attributes.

The user interface of the electronic device may be in communication with the keyword attribute database (115) via the server which may dynamically provide (173) a list of possible keyword attributes previously used by other listing users. This may be dynamically populated in the user interface whilst the listing user is inputting the media content. This may be in response to individual characters of a keyword attribute being sequentially entered by the listing user, prompting the listing user with a dynamic list of keyword attributes previously selected by other listing users with the same starting characters. The listing user may select one of the keyword attributes previously selected by other listing users, or if none of the keyword attributes previously selected by other listing users are selected may create a new keyword attribute which may be added to the keyword attribute database (115) and subsequently including the keyword attribute in the list of keyword attributes prompted to other listing users.

The user interface of the electronic device may also receive (174) an item category selected by the listing user specifying a type of offer made by the listing user for the available item. The item category is one of: an offer to sell, an offer to rent, an offer to swap, an offer to give away, or other disposal or trade of the item.

The electronic device may transmit (175) the media content, keyword attributes, and item category to a server system for storing as an item record in an item database together with other previously listed items.

The electronic device may also transmit (176) location data identifying the location of the available item. This may be provided in the background by a location service of the electronic device. If the electronic device is also used by an accessing user, this location information may also be used when comparing locations to locations of other listing users.

A user interface of the electronic device may provide (180) an accessing user with information regarding available items including displaying the item records on a display of the electronic device. The accessing user may provide inputs to navigate (181) the available items using method discussed in detail below.

In addition, the user interface of the electronic device may apply filtering (182) in response to accessing user input to enable an accessing user to filter available items by one or more of: the keyword attributes, the location of the available item, and an item category.

The user interface may dynamically repopulate (183) a display in response to a user input, to display only those available items stored on the item database which match one or more of: the location, keyword attributes, and a category specified by the user.

Location information of an electronic device of an accessing user may be used (184) to filter available items and display the items based on proximity to the accessing user when compared to a listing user for each item.

The user interface of the electronic device may receive and transmit (185) to the server system a selection of an available item from an accessing user and optionally a comment on the available item, the comment then being associated by the server system with the available item and visible to all other accessing users. The user interface may enable (186) the accessing user to commence a private conversation with the listing user via a communication technology of the server system (110).

Figure 2A:
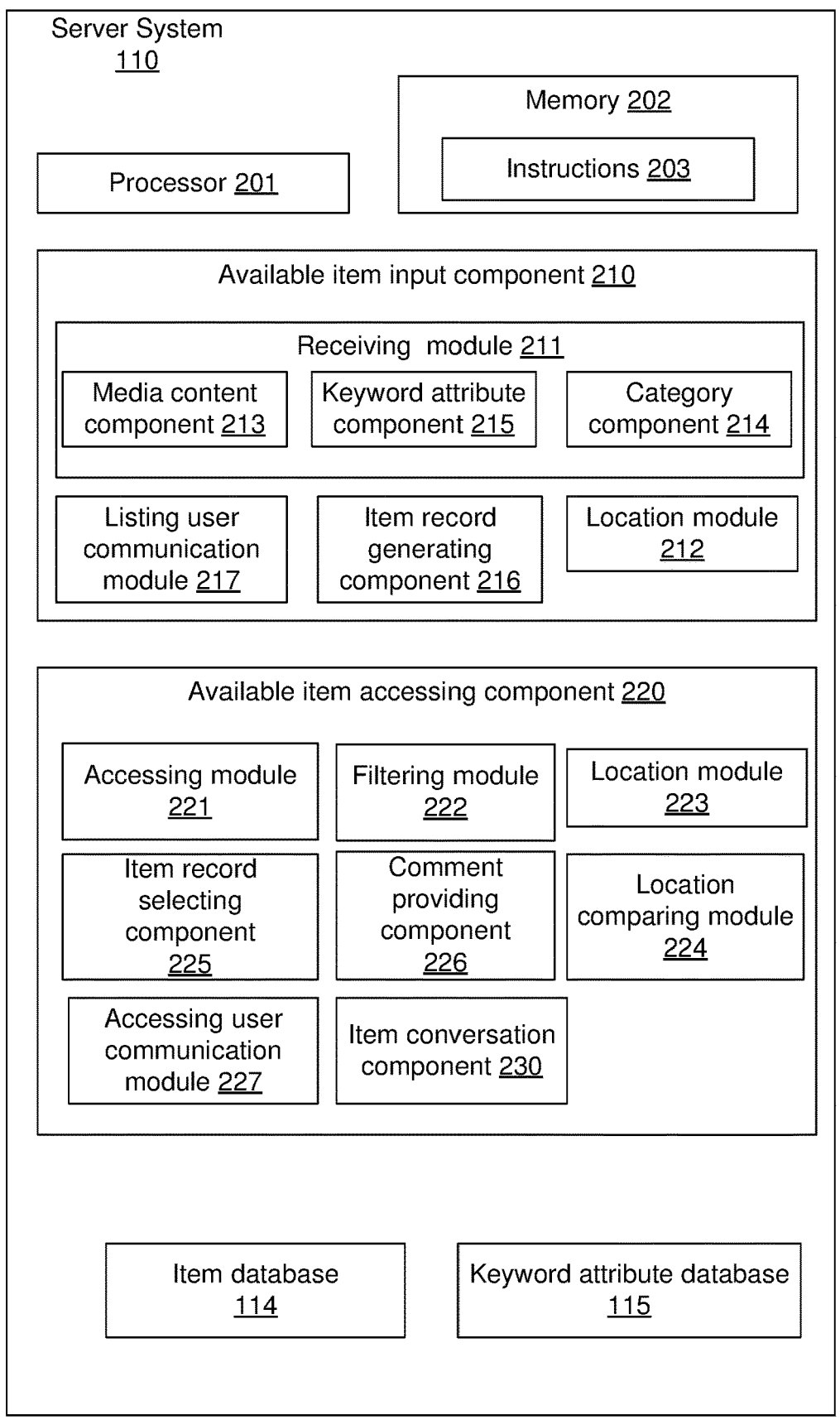
FIG. 2A is a block diagram illustrating components of an embodiment of a server system according to the technology.

Logical components of an exemplary server system (110) are shown in FIG. 2A. The server system (110) may include at least one processor (201), a hardware module, or a circuit for executing the functions of the described components or modules. The described components or modules or the system may be software units executing on the at least one processor. Memory (202) may be configured to provide computer instructions (203) to the at least one processor (201) to carry out the functionality of the components. The server system (110) may be provided may multiple servers provided a various locations.

The server system (110) may include access to the item database (114) for storing the description, depiction and keyword attributes of the available item as an item record and keyword attribute database (115) for storing keyword attributes. The item database (114) and the keyword attribute database (115) may be provided locally to the server system (110) or remotely with remote communication access. Further details of the item database (114) are described with regard to FIG. 2B.

The server system (110) may include an available item input component (210) for receiving input from an electronic device of a listing user.

The available item input component (210) may include a receiving module (211) for receiving media content relating to an available item from an electronic device of a listing user, and for receiving one or more keyword attributes that define attributes of the available item. An item record generating component (216) may be provided for generating an item record for a new available item and submitting the generated item record to the item database (114).

The receiving module (211) may include a media content component (213) for receiving and processing the media content for an available item and providing this to the item record generating component (216).

The receiving module (211) may include a keyword attribute component (215) for identifying and associating keyword attributes with the item record generated by the item record generating component (216). The keyword attribute component (215) may include a dynamic keyword population function for prompting the listing user with suggested keywords. The keyword attributes may also be added to the keyword attribute database (115) by the keyword attribute component (215).

The receiving module (211) may also include a category component (214) for receiving and associating a category to the item record.

A location module (212) may be provided for receiving location data identifying the location of the available item as supplied by the electronic device of the listing user determining its current location. Alternatively, the location module (212) may receive location data as input by the listing user of an alternative location where the available item will be provided.

A listing user communication module (217) may be provided for enabling communication by an accessing user with the listing user via the server system (110).

The server system (110) may also include an available item accessing component (220). The available item accessing component (220) may include an accessing module (221) for allowing access to available items stored in the item database (114) to an electronic device of an accessing user. The accessing module (221) may enable the accessing user to navigate through the item records. A filtering module (222) may be provided for enabling the accessing user to filter item records stored in the item database by the keyword attributes and/or location data so as to view available items that match the keyword attributes.

An item record selecting component (225) may be provided enabling an accessing user to select an item record. A comment providing component (226) may be provided for enabling an accessing user to provide a comment in relation to an item record.

A location module (223) may be provided for receiving location data of an accessing user and a location comparing module (224) may be provided for generating proximity information for item records by comparing the location data of the item record with the accessing user's location.

An accessing user communication module (227) may be provided for enabling communication by with accessing user by the listing user.

An item conversation component (230) may be provided for adding accessing user and listing user comments to a conversation record for an item record. The conversation record may be stored with the item record and may be accessed and viewed by all users.

Figure 2B:
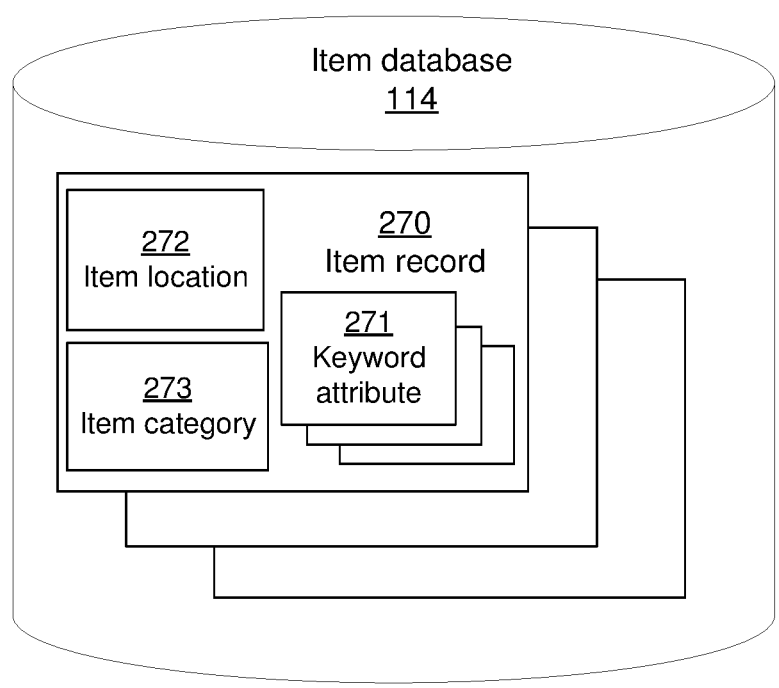
FIG. 2B is a block diagram of an exemplary database structure according to the technology.

FIG. 2B shows an exemplary database structure of the item database (114). The database includes a plurality of stored item records (270). Each item record has a stored item location (272), a selected item category (273) and a number of keyword attributes (271). The item records are stored and categorized based on the user-generated keyword attributes (271) without employing a pre-set or hierarchical classification database structure. In other words, the keyword attributes are not predefined but are user generated.

The item database (114) may be filtered, referenced, searched and accessed by one or more of the keyword attributes, the item category and the location. It will be appreciated that the item record also includes many other items of data in addition to the keyword attributes, item category and location. For example, the item record may also include user data, notifications, and comments posted, among many other items of data.

Figure 2C:
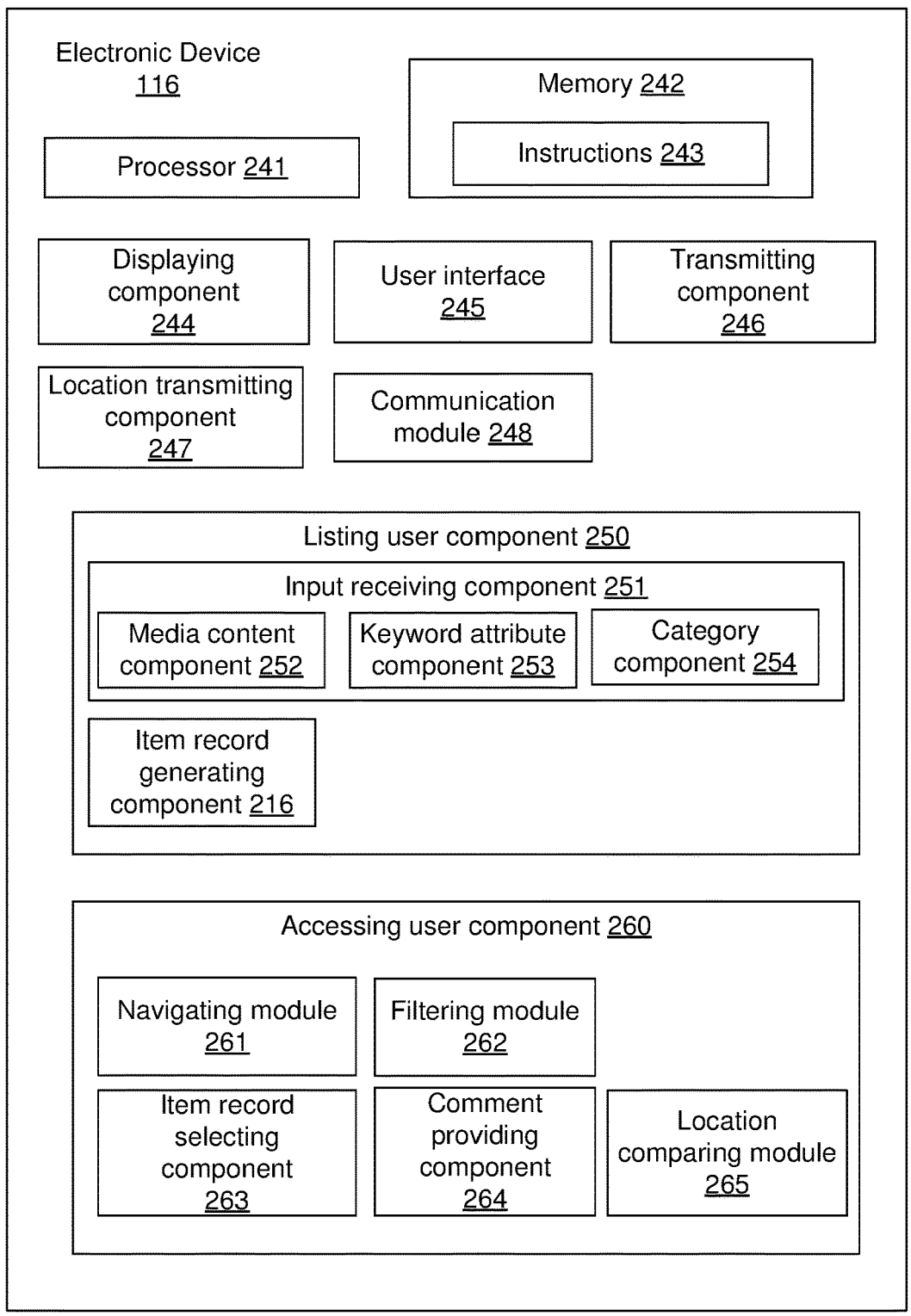
FIG. 2C is a block diagram illustrating components of an embodiment of an electronic device according to the technology.

Logical components of an exemplary electronic device (116) are shown in FIG. 2C as used by a listing user and/or accessing user.

The electronic device (116) may include at least one processor (241), a hardware module, or a circuit for executing the functions of the described components. The described components or modules or the system may be software units executing on the at least one processor. Memory (242) may be configured to provide computer instructions (243) to the at least one processor (241) to carry out the functionality of the components The electronic device (116) includes a user interface (245) for inputting and navigating around a listing user component (250) and/or an accessing user component (260) providing the described functionality at the electronic device. The described components of the electronic device may correspond to components of the server system (110) providing the complementary aspects.

A transmitting component (246) may transmit data relating to an available item and other inputs to the server system (110). A displaying component (244) may be provided displaying available items and associated information. A location transmitting component (247) may transmit location data of the electronic device (116) to the server system (110).

The listing user component (250) may include an input receiving component (251) for a new item to be listed. The input receiving component (251) may include a media content component (252) for receiving user input of media content of the available item. The input receiving component (251) may include a keyword attribute component (253) for receiving user input of keyword attributes. The input receiving component (251) may include a category component (254) for receiving user input of a category for the new item.

An accessing user component (260) may be provided with a navigating module (261) for navigating through a display of available items provided by communication with the server system (110). A filtering module (262) may be provided for filtering the available items by one or more of: keyword attributes, location, time stamp, and/or category.

The accessing user component (260) may include an item selecting component (263) enabling an accessing user to select an item. A comment providing component (264) may enable an accessing user to add a comment to a selected item and see other comments provided by other accessing users and the listing user.

A location comparing module (265) may be provided for comparing a listing user's location stored with an item record with the current location of the electronic device as used by the accessing user.

Specific examples of methods and user interfaces are now described with reference to the figures.

Figure 3:
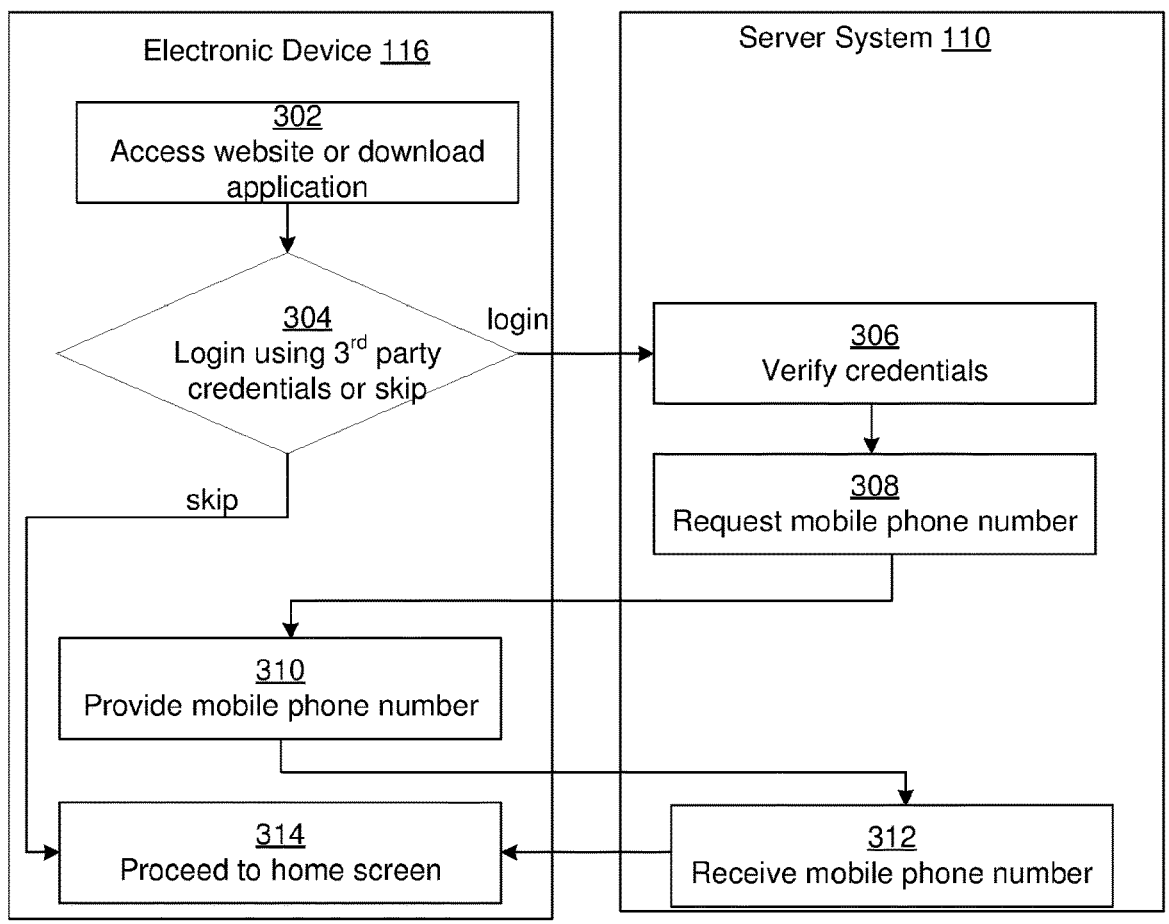
FIG. 3 is a swim-lane flow diagram illustrating a method of registering according to the technology.

FIG. 3 illustrates the steps involved in initial registration in order to gain access to the technology. At a first stage (302), the user (122) who may be a listing user and/or accessing user uses the electronic device (116) to access the server system (110), which can be by browsing to a particular website or downloading an application onto the electronic device (116). The user is then prompted to log in to the server system at a next stage (304). In one embodiment, the user may be prompted to log in with the login credentials of a third party such as a social networking site, so as to minimize effort for the user and link the user's social networking profile to the technology. The user may also have the option of skipping the login stage if the user does not want to initially register. If the user logs in, then the user's credentials are verified at a next stage (306) and the user's mobile phone number is requested at a next stage (308). The user's mobile phone number is requested so that the user is able to exchange contact details with other users as will be elaborated upon herein. A mobile phone number may also be authenticated through an optional step (not shown) in which the server system (110) transmits a unique code to the electronic device, which the user is required to enter to verify that the user owns the mobile phone number. The user provides its mobile phone number at a next stage (310) which is then received and stored by the server system (110) in a user record at a next stage (312), after which the user is directed to a home screen at a next stage (314). If the user skips logging in at stage (304), then the user is taken directly to the home screen at stage (314). If a user accesses the technology without logging in, then before the user can initiate actions like posting an item, or commenting as will be further described herein, they will be prompted to login at that stage and their mobile phone number requested.

Figure 4:
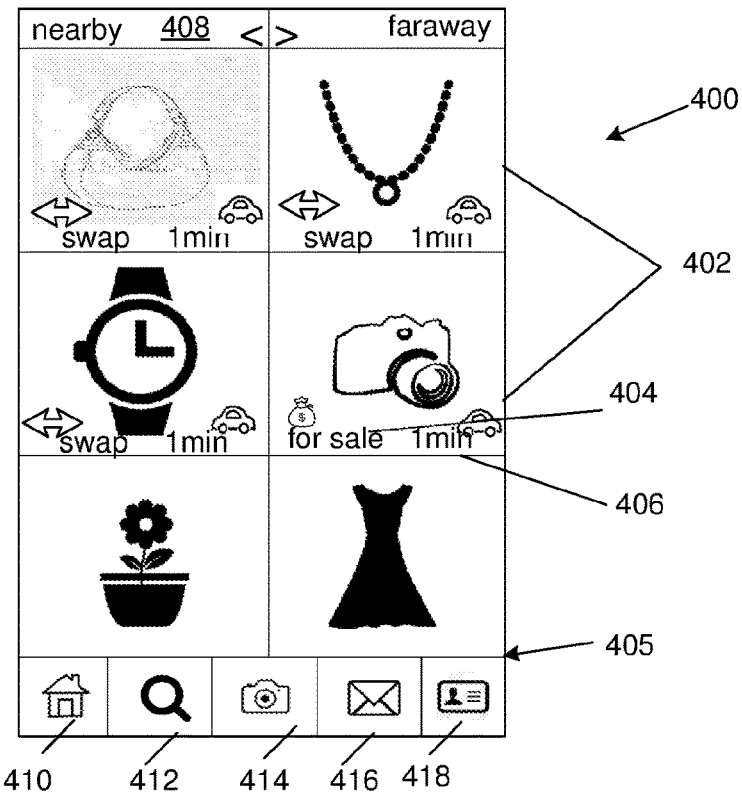
FIG. 4 is a schematic diagram of a screen shot of an exemplary user interface for a home screen according to the technology.

FIG. 4 shows an exemplary user interface for a home screen (400) according to the technology. The home screen shows a depiction of available items (402) arranged in a tiling arrangement, with recently posted items listed at the top of the screen and older items lower down which the user can scroll down to view. Fewer or more available items can be displayed by a user pinching the screen to zoom in or out. To maximize viewing space, as a user scrolls down the header of the screen and bottom tab collapse. The available items can be refreshed by a user attempting to pull the screen down when at the top of the list of available items, or the available items can be automatically refreshed when available. Overlaying each available item, an item category (404) is provided, the item category being one of an offer to sell, an offer to swap or an offer to give. An item category symbol may also or alternatively be provided. The available items may also be color-coded according to their item categories, for example by means of a thin bar underneath each depicted item. A distance indicator (406) also overlays each available item and indicates traveling time between the location of the user and the location of the listed item. A symbol may be provided indicating the mode of transport used to calculate the traveling time. At the top of the user interface, a range slider (408) is provided, and at the bottom of the user interface, a universal tab bar (405) is provided. The range slider (408) enables the displayed available items to be filtered by distance as will be further explained herein, and the universal tab bar (405) provides links to the home screen (410), search screen (412), listing screen (414), notification center screen (416) and profile screen (418).

Figure 5:
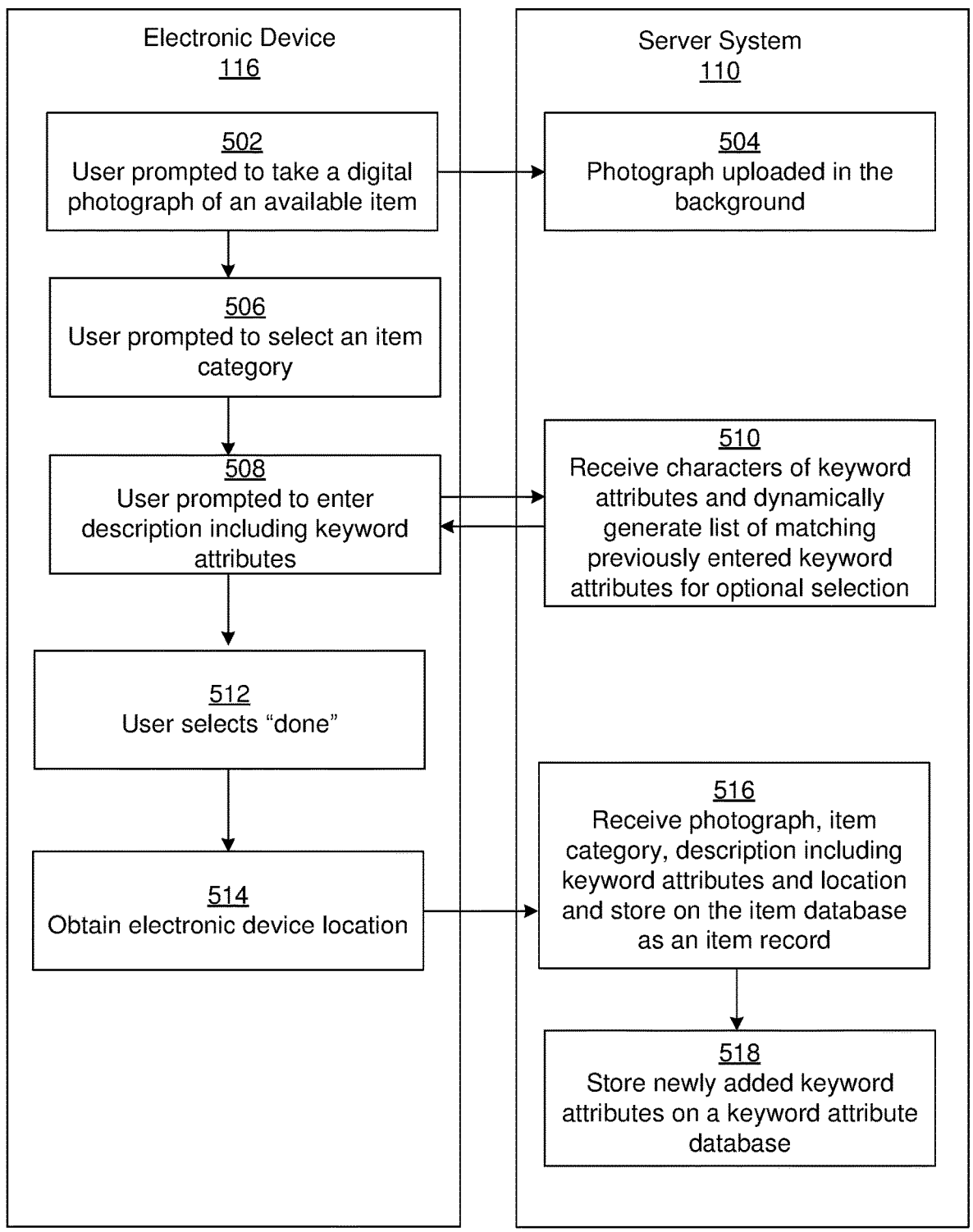
FIG. 5 is a flow diagram illustrating a method of exchanging information about an available item according to the technology.
Figure 6A:
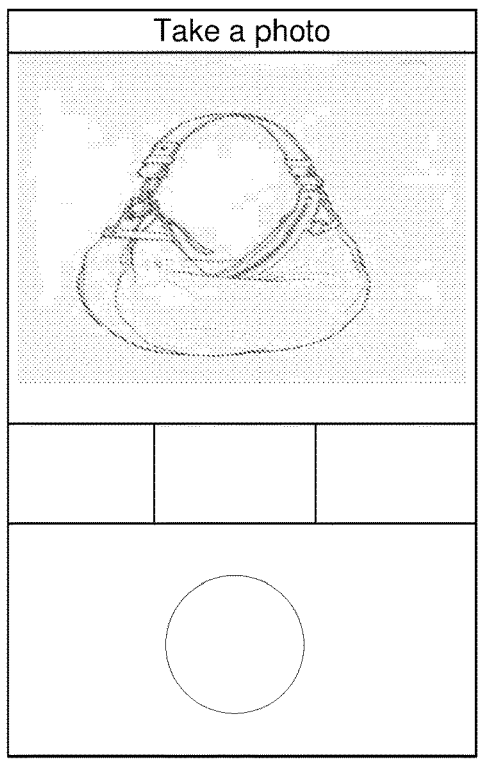
FIGS. 6A to 6D are schematic diagrams of screen shots of exemplary user interfaces showing various stages of the method illustrated in FIG. 5.

FIG. 5 is a flow diagram illustrating an example method of exchanging information about an available item according to the technology, and FIGS. 6A to 6D show corresponding screen shots of exemplary user interfaces that could be used in the method. The method of FIG. 5 relates to listing an available item and is triggered by pressing the listing screen link (414) from the home screen. In this case the user is listing an item and will therefore be referred to as a "listing user". According to the method, at a first stage (502), the listing user (122) is prompted to obtain a depiction of the available item, in this example by taking a digital photograph of an available item using a built-in camera of the electronic device (116). This stage is shown in FIG. 6A. Additional functionality at this stage could include selecting a photograph from the memory of the electronic device, taking a video instead of a photograph, and editing the photograph to enhance the quality of the photograph, such as by applying filters, red-eye reduction, cropping or brightness settings.

Figure 6B:
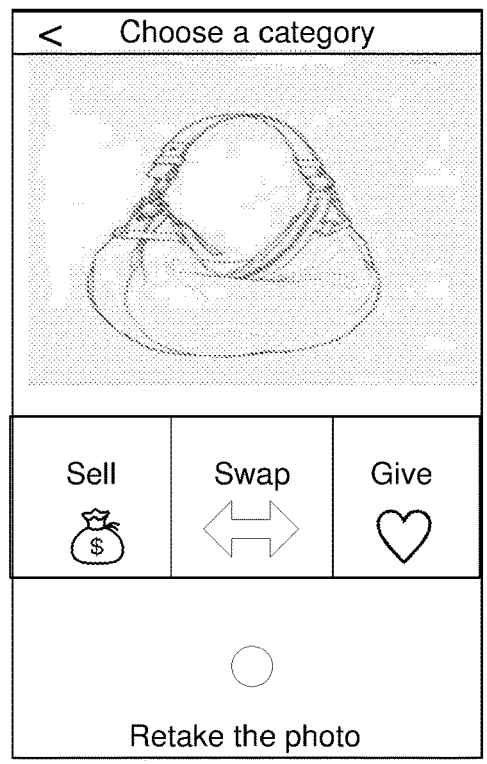

Once the digital photograph has been taken or selected, upload of the photograph to the server system (110) commences immediately in the background at a next stage (504). This is done to decrease upload time delay upon completion of the steps of the method. The listing user (122) is then prompted to select an item category for the available item at a next stage (506), the item category specifying a type of offer made by the listing user. This stage is shown in FIG. 6B. In this illustration, three item categories are illustrated, namely "sell", "swap" and "give". A selection of "sell" by the listing user indicates that the listing user wishes to offer the item for sale, a selection of "swap" that the listing user wishes to swap the item, and a selection of "give" that the listing user wishes to give the item away for free. These item categories are merely illustrative and many other item categories can be envisaged—for example, an offer to rent or lend, an offer to view, an offer to share, and offer to pass on, or an offer to meet, to name but a few. In some embodiments, more than one item category could be selected to indicate that a user is making more than one kind of offer—e.g. to sell or to swap.

Figure 6C:
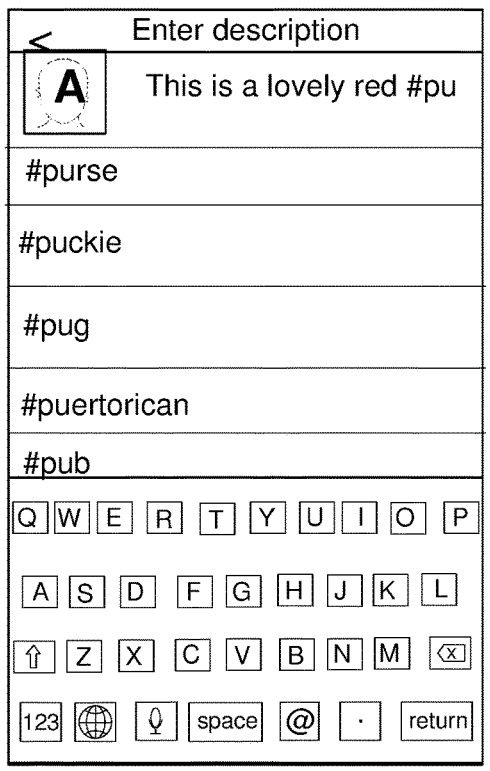

After selecting the item category, the user is prompted to enter a description of the item that includes keyword attributes at a next stage (508), which is also illustrated in FIG. 6C. The description entered is a free-form paragraph written by the listing user and which has certain keywords generated by the listing user and identified as attributes. In this illustration, keyword attributes are identified by a specific action performed such as input provided by the listing user in relation to the keywords, which in this case is a hashtag, "#", preceding each keyword. At a next stage (510) the server system (110) receives individual characters of each keyword attribute and dynamically generates a list of matching keyword attributes previously entered by other users. This is shown in the drop down list of FIG. 6C. In this case, the first keyword attribute that the listing user starts writing is "#pu". As the user types each character of the keyword attribute, those characters are received by the server system and the listing user prompted with all previous attributes that other users have entered that start with the same characters. The listing user can optionally select from the list or can generate a new keyword attribute by entering a word that is not on the list. Keyword attributes can include any word which the listing user chooses to make up (for example, #mikesdvds), words which have recently been adopted to name or describe a particular product or service or are trademarks or trade names (for example as #xbox), and can be word combinations with no spaces as may commonly be used, such as #diamondring, #exceptionalvalue, or #brandnew. Of course, keyword attributes can be entered in any language, and the server system requires no configuration for adoption for new languages as the keyword attributes are simply entered by users to be understood by other users, without requiring any interpretation on the part of the server system.

Figure 6D:
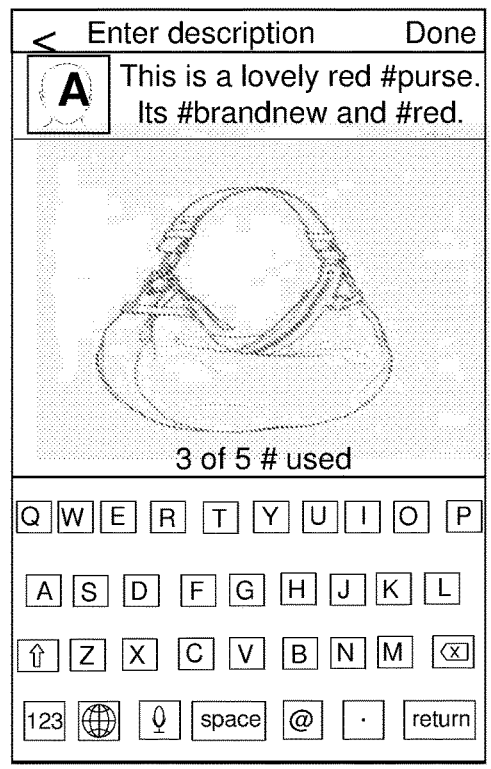

The listing user may be able to type a description that includes up to a certain number of attributes, such as up to five attributes. The number of remaining available attributes is shown in FIG. 6D—"3 of 5 #'s used". Upon completion of the description at a next stage (512) and as shown in FIG. 6D, the listing user selects "done". In the background and at a next stage (514), the electronic device then obtains its current location, for example by using a built-in GPS module of the electronic device or by trilateration techniques according to well-known methods. At a next stage (516), the photograph, item category, description which includes the keyword attributes and location are then received by the server system and are stored on the item database as an item record. A timestamp is also taken by the server system at or close to the time at which the item record is stored in the item database and the timestamp is stored as part of the item record. At a final stage (518), the server system stores any newly added keyword attributes on the keyword attribute database (115) so that those keyword attributes can be prompted to other listing users according to the method described herein. The keyword attribute database (115) is therefore, in this embodiment, entirely user-generated.

It will be appreciated that from the perspective of the listing user, the process for listing an available item may be a simple three step process—taking a photograph, selecting an item category and entering a description that includes hashtags. This may lead to an improved user experience as users may find the method significantly more convenient than previous methods of creating a listing in a classified system. The keyword attribute database is preferably entirely user-generated, and a user is not compelled to select pre-existing keyword attributes but can create new ones.

Figure 7:
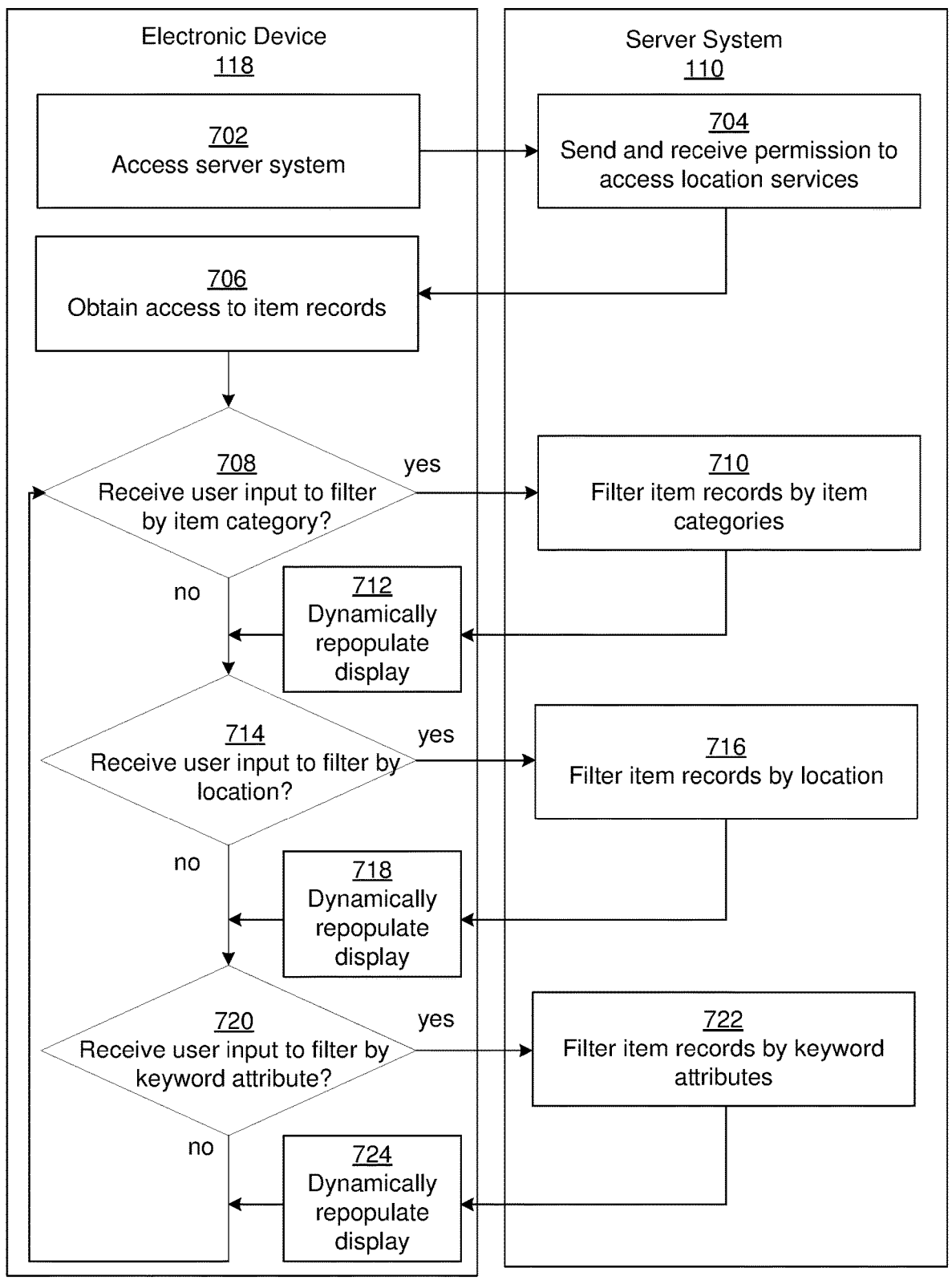
FIG. 7 is a flow diagram illustrating a method of exchanging information about an available item carried out by an accessing user according to the technology.

FIG. 7 is a flow diagram illustrating a method of exchanging information about an available item according to the technology. In this case, the user (124) is a user accessing the server system for the purpose of viewing the available items, and will be called an "accessing user". Of course, it will be appreciated that accessing users can also be listing users who have listed items.

Figure 8A:
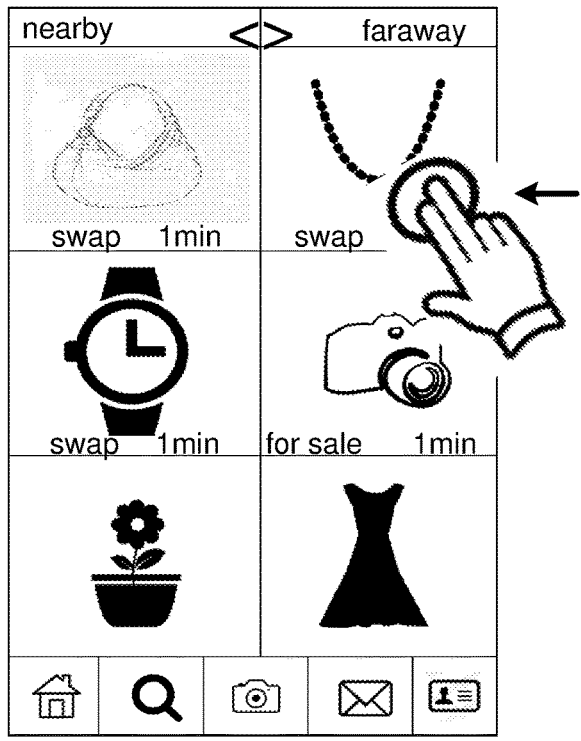
FIGS. 8A to 8D are schematic diagrams of screen shots of exemplary user interfaces showing aspects of the method illustrated in FIG. 7.

At a first stage (702), the accessing user (124) uses the electronic device (118) to access the server system (110). At a next stage (704), the server system sends a request to the user's electronic device (118) to grant permission for access to location services on the device and receives permission. Once the user grants access to location, the server system determines the item records to display and grants the user access to item records within a pre-determined proximity range, as shown at a next stage (706). The item records may be displayed in the format illustrated in FIG. 8A and as previously described with reference to FIG. 4, in which the depictions of the available items are displayed in a tiling fashion with recently posted items listed at the top of the screen and older items lower down which the user can scroll down to view. In this example item categories ("sell", "swap" or "give") overlay each available item.

Figure 8B:
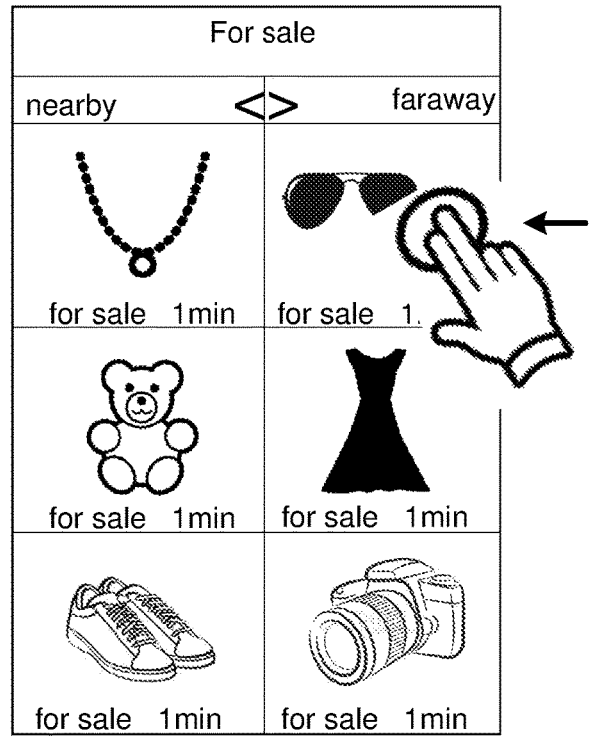
Figure 8C:
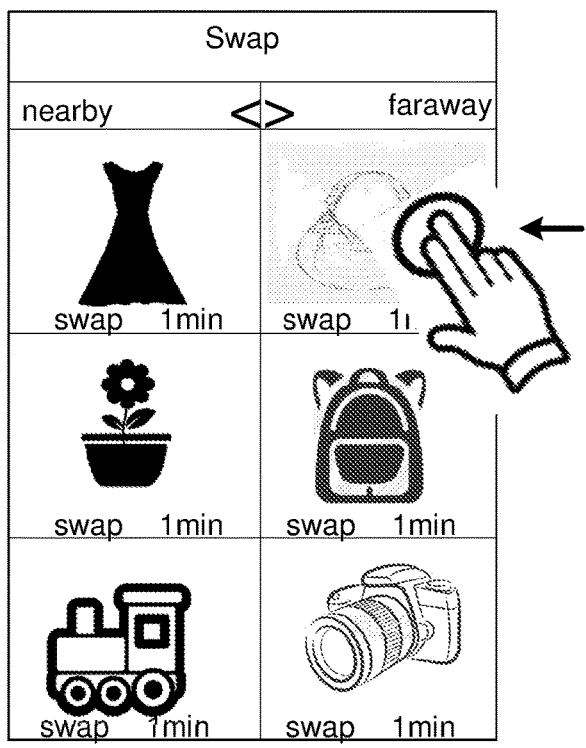
Figure 8D:
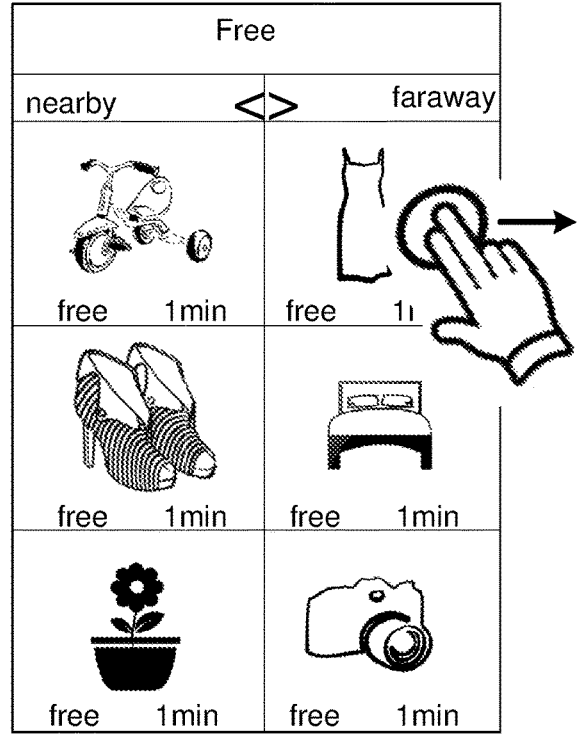

The following steps illustrated can be carried out in any order. At one stage (708), the electronic device optionally receives user input to filter the item records by item category. In response to the predefined user input, the server system filters the item records by the selected item category at another stage (710), and at another stage (712), the display is dynamically repopulated to display only those item records which match the item categories selected by the user. One exemplary technique for filtering the item records by item category is illustrated in FIG. 8A to 8D. In this illustration, and beginning on the home screen illustrated in FIG. 8A, swiping the screen to the left once causes only item records that have the category "For sale" to be displayed as shown in FIG. 8B. Swiping left again causes only items that have the category "Swap" to be displayed as shown in FIG. 8C. And finally, swiping left again causes only items that have the category "Free" to be displayed. The process can be reversed by swiping right to return to one of the previous categories or the home screen.

Figure 9A:
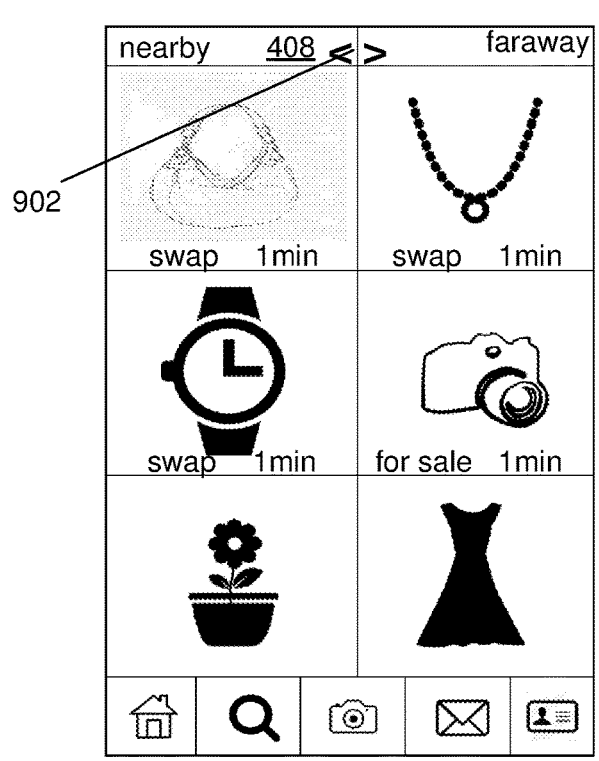
FIGS. 9A to 9C are schematic diagrams of screen shots of exemplary user interfaces showing other aspects of the method illustrated in FIG. 7.
Figure 9B:
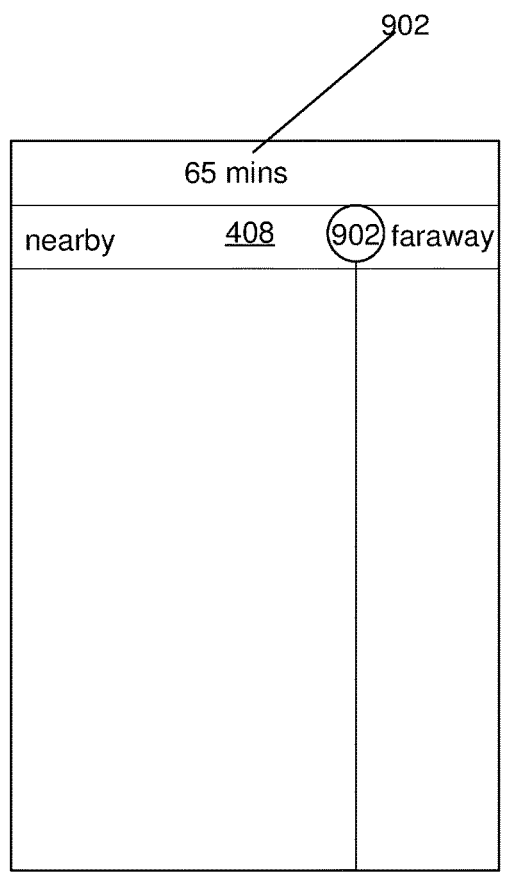
Figure 9C:

At another stage (714), the electronic device (118) optionally receives user input to filter the item records by location, which in this embodiment is based on a comparison of the location of the available item stored in the item record and location data of the electronic device (118) of the accessing user (124). In response to the predefined user input, the server system (110) filters the item records by the selected location at another stage (716), and at another stage (718) the display is dynamically repopulated to display only those item records which match the specified location data selected by the user. One exemplary technique for filtering the item records by location is illustrated in FIGS. 9A to 9C. In this illustration, and beginning on the home screen illustrated in FIG. 9A, the user touches and holds a selection point (902) of the range slider (408). This causes the background screen to grey-out and the range slider (408) to be emphasized as shown in FIG. 9B. By moving the selection point (902) left or right, a distance indicator (904) appears and dynamically increments or decrements based on the movement of the selection point. The distance indicator (904) indicates the distance indicated in minutes between the accessing user and the stored location of available items, and is calculated by the server system according to driving time or a variety of other possible methods. Upon releasing the selection point (902) of the range slider (408), the display is dynamically repopulated to display only those item records which match the specified location data specified by the user, as shown in FIG. 9C, which in this case is less than 65 minutes driving time between the accessing user and the stored location of the available items. The item records are still listed chronologically by using the stored timestamps, with the most recently posted items appearing at the top and the user able to scroll down to view more available items.

Figure 10A:
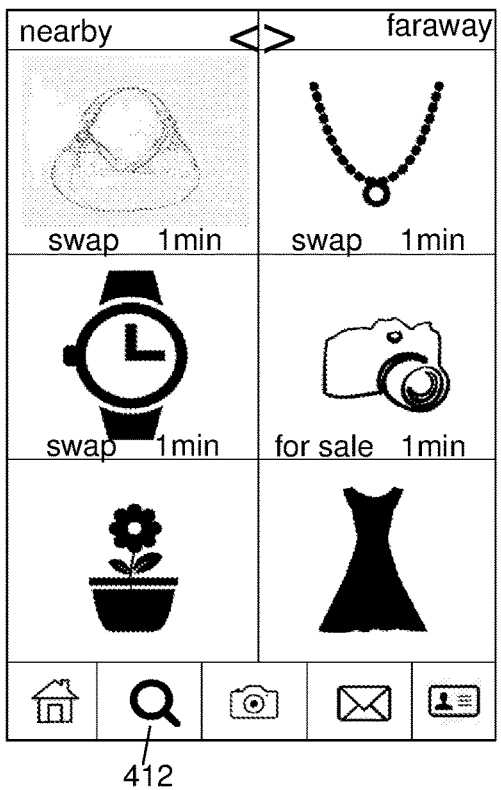
FIGS. 10A to 10D are schematic diagrams of screen shots of exemplary user interfaces showing other aspects of the method illustrated in FIG. 7.
Figure 10B:
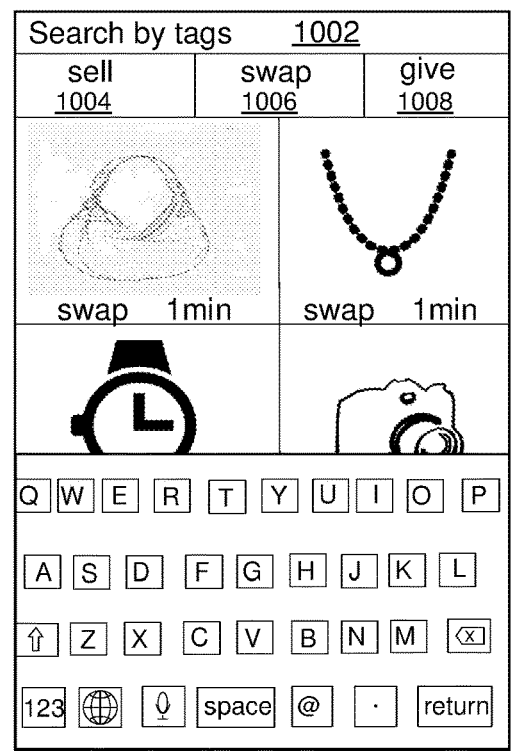
Figure 10C:
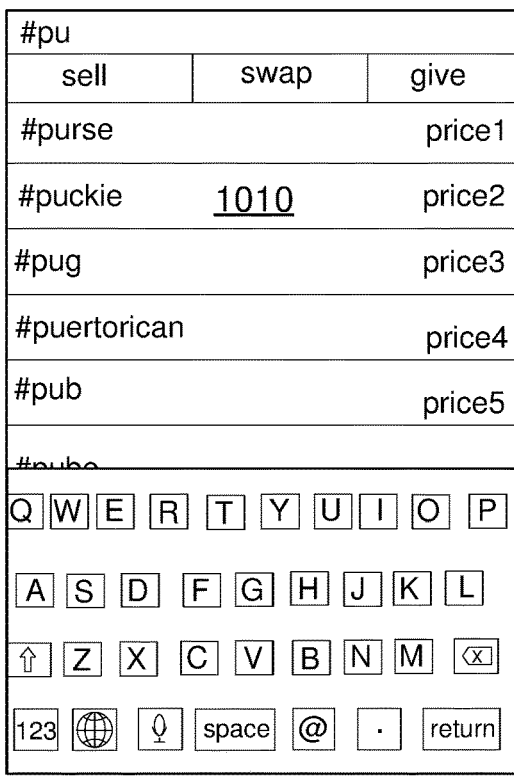
Figure 10D:

At another stage (720), the electronic device (118) optionally receives user input to filter the item records by keyword attributes. In response to predefined user input, the server system (110) filters the item records by the selected keyword attributes at another stage (722), and at another stage (724) the display is dynamically repopulated to display only those item records which match the specified keyword attributes selected by the user. The method then repeats itself allowing the user to filter results by one or more of item category, location and keyword attribute in any order. One exemplary technique for filtering the item records by keyword attribute is illustrated in FIGS. 10A to 10D. In this illustration, from the home screen shown in FIG. 10A, the user clicks the "search" link (412). This brings up the search screen shown in FIG. 10B. On this screen, the accessing user can type in keyword attributes to search for in the "Search by tags" search bar (1002). The accessing user can also simultaneously filter by item category by selecting or deselecting the "sell", "swap" or "give" buttons (1004, 1006, 1008) immediately below the search bar (1002). As soon as the user starts typing, the server system generates a drop down list (1010) of keyword attributes stored in the keyword attribute database that match the characters that the accessing user is typing, as shown in FIG. 10C. Next to each keyword attribute, the number of item record results (1012) stored in the item database for each attribute is indicated. The accessing user must select from the dropdown list and may optionally enter further words to narrow the results further, for example, "#purse #red". Once the user has completed selection of the keyword attribute(s) of interest, the display screen is dynamically repopulated. For example, as shown in FIG. 10D, upon selection of "purse" as the keyword attribute, only purses are shown on the display screen.

FIG. 11A to 11G are screen shots of exemplary user interfaces showing additional details of listed items according to the technology, by means of which an accessing user can obtain further information and interact with a listing user so as to conclude a transaction. From the home screen shown in FIG. 11A, or from any corresponding filtered result home screen, the accessing user taps on an image of a specific item of interest, in this case the watch on the right of the screen. Tapping on the image brings up the detail view shown in FIG. 11B. This detail view shows a larger image (1102) of the available item, the item category (1104) of the available item, the time (1106) it would take to travel to the stored location of the available item, and a list of comments (1108) associated with the available item and visible to all accessing users. Two additional action objects are shown in the bottom right-hand corner of the larger image (1102), namely a report abuse button (1110), by means of which the accessing user can report dangerous or inappropriate content to the server system, and a favorites button (1112) which the accessing user can use to flag the item as a favorite item for later viewing. Long-tapping the image (1102) may also trigger the designation of the item as a favorite. Finally, two action objects are included at the bottom of the screen, namely a comment button (1114) and a chat button (1116) the functionality of which will be explained below.

Figure 11A:
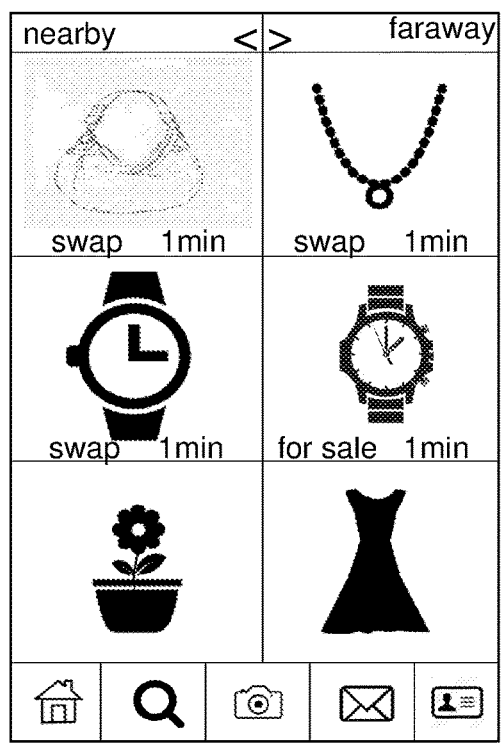
FIG. 11A to 11G are schematic diagrams of screen shots of exemplary user interfaces showing additional details of listed items according to the technology.
Figure 11B:
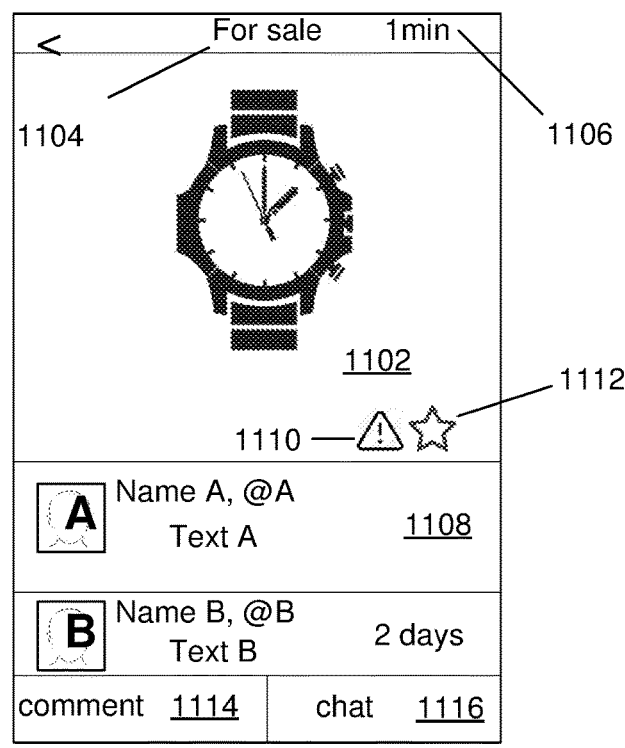
Figure 11C:
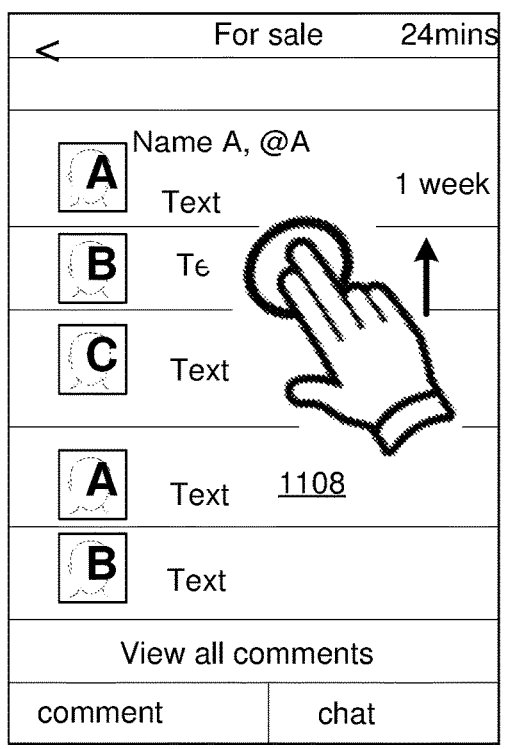

Swiping the comments section (1108) up, as shown in FIG. 11C, reveals the full string of comments regarding the available item, with the photograph of the item fading out into the background. Here the accessing user can view the comments or questions that other accessing users have posted about the item. The accessing user may also be able to run additional searches by tapping on the "hashtagged" words that appear in the comments. Swiping the comments section (1108) down, returns the view to the detail view of FIG. 11B.

Figure 11D:
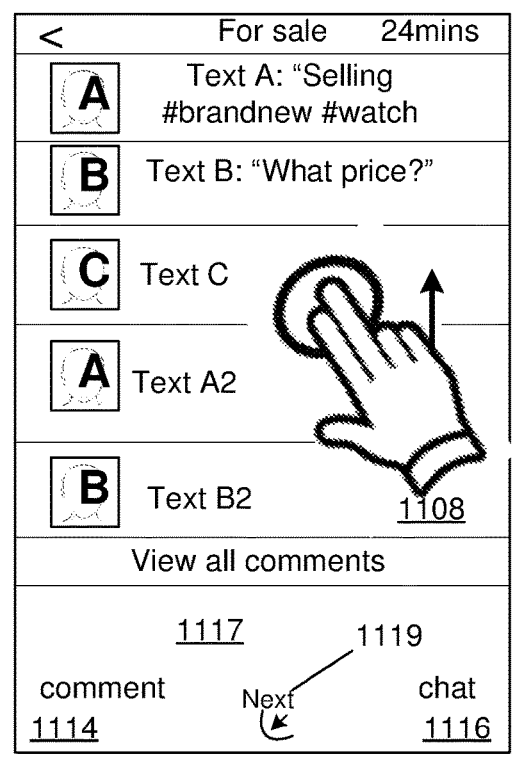

Swiping the comments section even further up, as shown in FIG. 11D, causes the comments button (1114) and chat button (1116) to separate and reveal the image of the next listed item (1117), which is slightly lowered in brightness and has an arrow (1119) pointing downwards. Upon swiping up beyond a certain threshold (which may, for example, be half the screen), the next image snaps into the position of the current image and the next available item is displayed in the same way as in FIG. 11B. Swiping up reveals the previous listing which again snaps into position to replace the current listing.

Figure 11E:
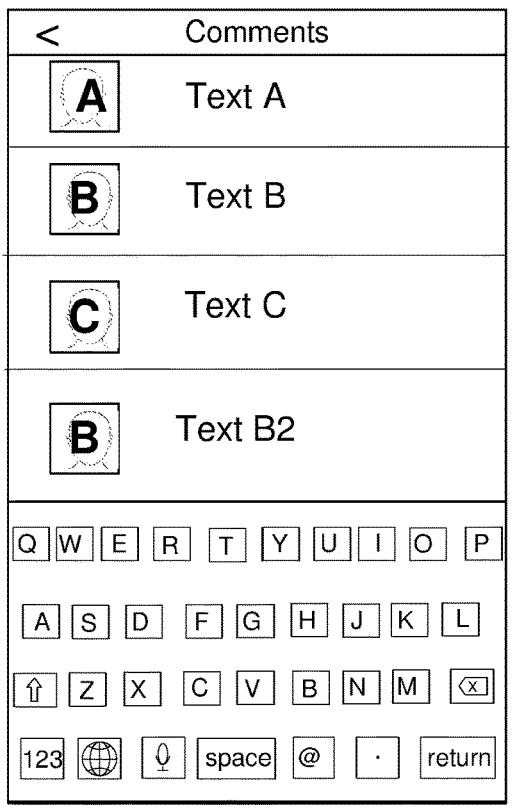
Figure 11F:
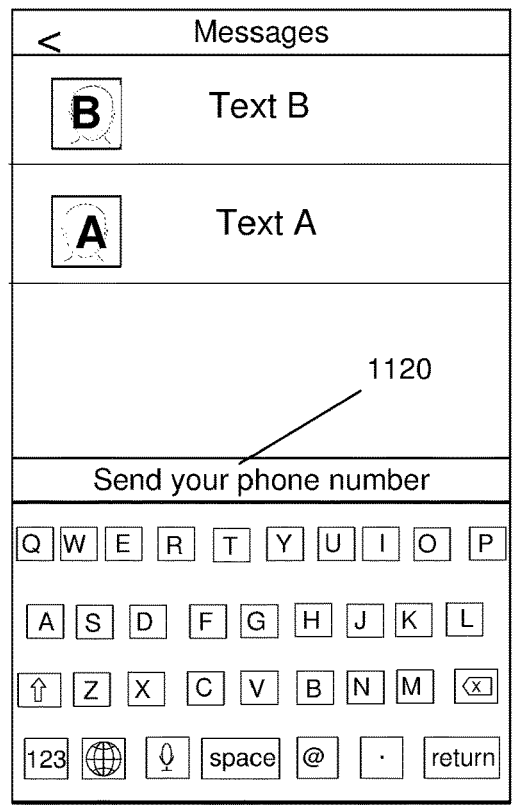
Figure 11G:
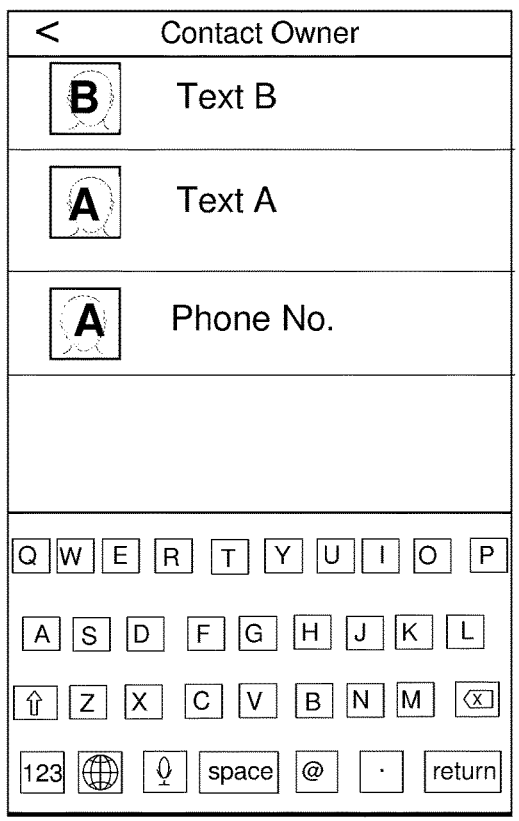

Pressing the comment button (1114) activates a comments interface as shown in FIG. 11E. Here, the accessing user can add a comment to the string of public comments. Pressing the chat button (1116) activates a chat interface as shown in FIG. 11F. Here, the accessing user is in a private conversation with the listing user. A "send your phone number" button (1120) is provided here by means of which the accessing user (and in a corresponding interface, the listing user) can send their phone number to the other user. Pressing this button (1120) accesses the phone number which was stored during the registration stage and transmits the phone number to the other user as shown in FIG. 11G. In other embodiments, an email address or other contact detail could be provided instead of a phone number.

According to the illustrated techniques, accessing users and listing users can easily exchange information about available items. Accessing users can post public comments on an available item which can be viewed by other accessing users, preventing accessing users from having to ask a question which other users may already have asked. Private conversations can easily be commenced by accessing users with listing users, to enable the users to quickly agree on matters such as price (if applicable), and when and where to meet to exchange or fulfil the available item.

FIGS. 12A and 12B shows an exemplary user interface for a notification center screen according to the technology. From the home screen shown in FIG. 12A, pressing on the notification center screen button (416) opens a notification center screen shown in FIG. 12B. Here, the user has the option of pressing on an activity button (1202) or a mailbox button (1204), with the default launch page being the activity button (1202). Under "activity" a chronological list appears of all interactions that occurred in relation to a user's available items, including public comments on an available item and private messages. Under "messages" is an inbox of private messages received from accessing users.

Pressing on the profile screen button (418) shown in FIG. 12A opens a user profile screen shown in FIG. 13. Here, two options are shown, "Favorites" (1302) and "Ads" (1304), with the default being the "Ads". From this interface, users can manage their selected favorites and their listed available items. To remove a listed available item, a user can swipe the listed item and press a delete button, as shown at numeral 1306. Users can also remove previously marked favorites by performing a similar action. It will be appreciated that the ease of removing items provided by this exemplary interface and method increase the likelihood of users removing posted available items once they are no longer available, such as after they have been sold, swapped or given away.

Selecting a settings icon (1308) in the profile screen of FIG. 13 opens a configuration page shown in FIG. 14. Here, a user can edit account details such as a profile photograph, name, phone number and biography. The user can also adjust notification settings to control what notifications the user will be prompted of. Functionality for inviting other users to use the mobile application or to rate the application may be provided.

While the technology has been described in relation to specific user interfaces and user interface functionality, numerous modifications and extensions to the technology fall within the ambit of the technology. For example, users may be able to designate other users as connections or users to follow, and users may then receive additional or separate content from their connections. The home screen can also be used to feature the most popular available items near the accessing user based on data gathered from available item listings such as the number of comments, number of favorites or average time for a first response to the available item, or the home screen could be split into separate forms of content arranged such as in two columns, where a first column is a feed that is relevant to the user and the other column contains newest listings, optionally with different scroll speeds for each row so as to promote viewing of content in one of the rows. The range slider could be extended to include an additional y-axis to switch between different modes of transport, such as driving, walking or public transport, or have other attributes such as price. Functionality could be included to enable users to rate other users according to the experience in transacting with those other users, to thereby enable users to build up a rating value which could be included in their available item listings.

Further extension to the technology could provide listing users with the ability to take multiple photographs of an available item from different angles and the electronic device to use the multiple photographs to create different views of the item, or a three dimensional rendering where the item can be virtually rotated. In addition to sharing their mobile numbers, listing or accessing users may be able to share their location so as to more easily arrange to meet, and communication technologies such as video conferencing may be enabled between users. A portal may be provided wherein users can make offers and receive counter offers until an agreed price is reached, and once agreement is reached, uses may be enabled to do a virtual handshake using their electronic devices either by tapping them together, transmitting unique sound waves that are received by the other proximate user, or through existing technologies such as iBeacon™ by Apple where push notifications can be sent once devices are in close proximity. Once agreement is reached, an available item could be removed from the publicly listed available items and transferred to the new user's collection. Transaction details such as the location and time of the handshake could be stored, and a user's rating or reputation could be affected by the number of virtual handshakes, the time taken to respond, the number of other users messaged and other factors.

Advanced searching capability could include a searching engine that allows users to take a picture and the server system to suggest words relating to the picture or returning available items similar to the picture. Users may also be able to search for other users around them based on certain parameters, such as users within a certain location having more than a certain number of items for sale. Instead of having location detection based on the location of the listing user or accessing user, users may be able to pin their location on a map, or the location of the available item on a map, for example where a user wishes to designate the location of an available item such as an apartment. Further functionality of the technology may include matching a listing user who is listing an item for swapping with another person who had previously shown an interest in a similar item, as well as a portal where accessing users can post what they need so that items listed for swapping can automatically be matched and listing users can start a conversation with accessing users. Technology for importing items from other channels (such as social networking websites) may enable automatic importation of information about available items into the server system in relation to a specific user.

Location-related additional technology could include tracking places that users visit and identifying potentially relevant available items based on the user's location—for example, if the user is in an electronics store, the home screen could present more electronics available items to the accessing user.

The technology extends to a computer program product for exchanging information about available items, the computer program product comprising a computer-readable medium having stored computer-readable program code for performing the steps of any of the methods described herein. The computer-readable medium may be a non-transitory computer-readable medium, the computer-readable program code being executable by a processing circuit.

Figure 15:
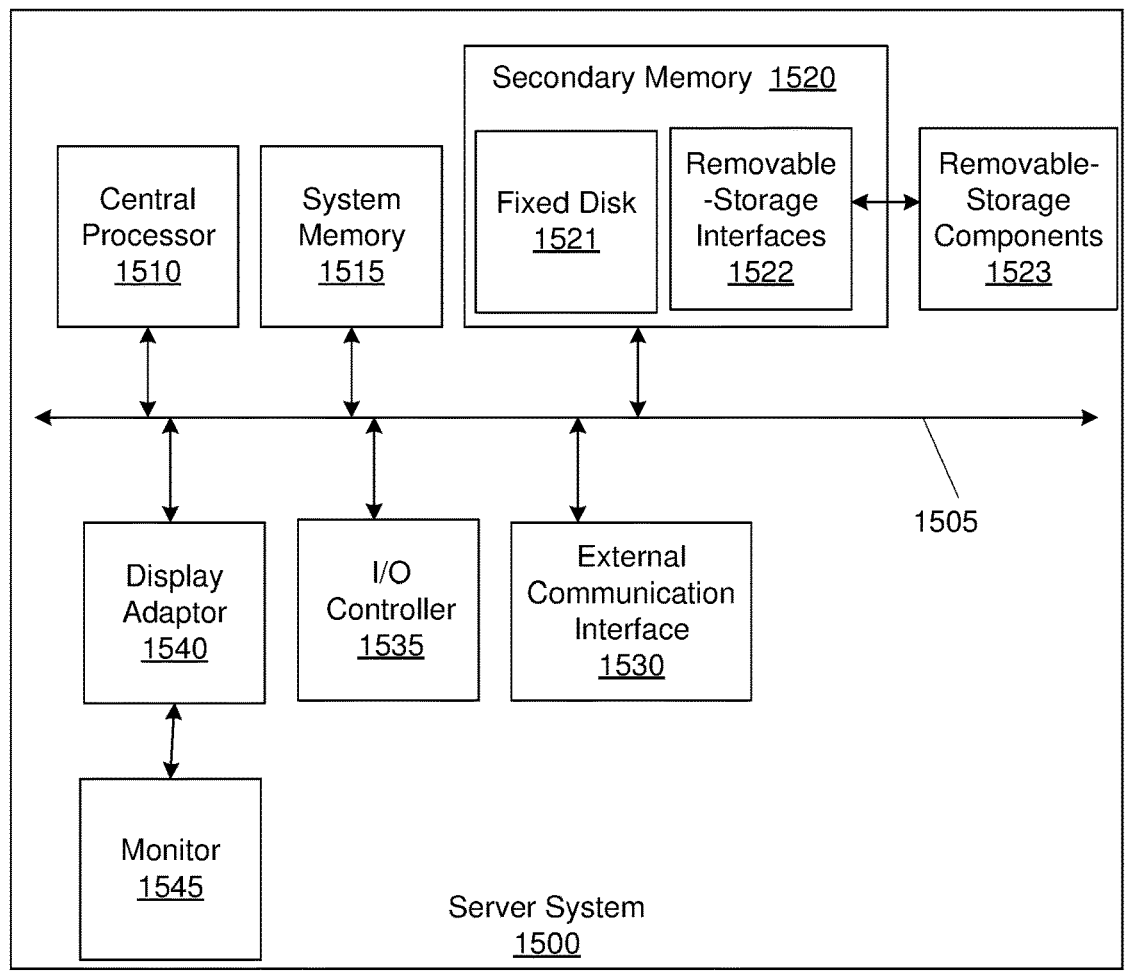
FIG. 15 illustrates an example of a server system in which various aspects of the disclosure may be implemented.

FIG. 15 illustrates an example of a server system (1500) in which various aspects of the disclosure may be implemented. The server system (1500) may be suitable for storing and executing computer program code. The various participants and elements in the previously described system diagrams may use any suitable number of subsystems or components of the server system (1500) to facilitate the functions described herein.

The server system (1500) may include subsystems or components interconnected via a communication infrastructure (1505) (for example, a communications bus, a crossover bar device, or a network). The server system (1500) may include at least one central processor (1510) and at least one memory component in the form of computer-readable media.

The memory components may include system memory (1515), which may include read only memory (ROM) and random access memory (RAM). A basic input/output system (BIOS) may be stored in ROM. System software may be stored in the system memory (1515) including operating system software.

The memory components may also include secondary memory (1520). The secondary memory (1520) may include a fixed disk (1521), such as a hard disk drive, and, optionally, one or more removable-storage interfaces (1522) for removable-storage components (1523).

The removable-storage interfaces (1522) may be in the form of removable-storage drives (for example, magnetic tape drives, optical disk drives etc.) for corresponding removable storage-components (for example, a magnetic tape, an optical disk etc.), which may be written to and read by the removable-storage drive. The removable-storage interfaces (1522) may also be in the form of ports or sockets for interfacing with other forms of removable-storage components (1523) such as a flash memory drive, external hard drive, or removable memory chip, etc.

The server system (1500) may include an external communications interface (1530) for operation of the server system (1500) in a networked environment enabling transfer of data between multiple server systems (1500). Data transferred via the external communications interface (1530) may be in the form of signals, which may be electronic, electromagnetic, optical, radio, or other types of signal. The external communications interface (1530) may enable communication of data between the server system (1500) and other server systems including external storage facilities. Web services may be accessible by the server system (1500) via the communications interface (1530). The external communications interface (1530) may also enable other forms of communication to and from the server system (1500) including, voice communication, near field communication, Bluetooth, etc.

The computer-readable media in the form of the various memory components may provide storage of computer-executable instructions, data structures, program modules, and other data.

A computer program product may be provided by a computer-readable medium having stored computer-readable program code executable by the central processor (1510).

A computer program product may be provided by a non-transient computer-readable medium, or may be provided via a signal or other transient means via the communications interface (1530).

Interconnection via the communication infrastructure (1505) allows a central processor (1510) to communicate with each subsystem or component and to control the execution of instructions from the memory components, as well as the exchange of information between subsystems or components. Peripherals (such as printers, scanners or the like) and input/output (I/O) devices (such as a mouse, touchpad, keyboard, microphone, or the like) may couple to the server system (1500) either directly or via an I/O controller (1535). These components may be connected to the server system (1500) by any number of means known in the art, such as a serial port. One or more monitors (1545) may be coupled via a display or video adapter (1540) to the server system (1500).

Figure 16:
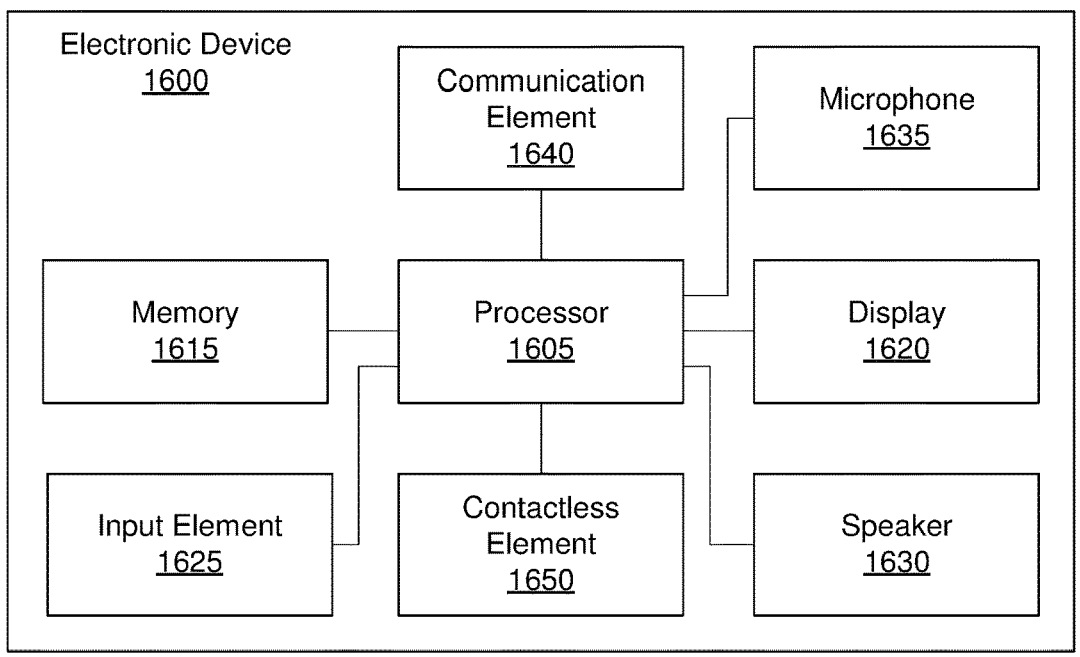
FIG. 16 shows a block diagram of an electronic device that may be used in embodiments of the disclosure.

FIG. 16 shows a block diagram of an electronic device (1600) that may be used in embodiments of the disclosure. The electronic device (1600) may be a mobile cell phone, a feature phone, a smart phone, a satellite phone, or a computing device having a phone capability. The electronic device (1600) may include a processor (1605) (e.g., a microprocessor) for processing the functions of the electronic device (1600) and a display (1620) to allow a user to see the phone numbers and other information and messages. The electronic device (1600) may further include an input element (1625) to allow a user to input information into the device (e.g., input buttons, touch screen, etc.), a speaker (1630) to allow the user to hear voice communication, music, etc., and a microphone (1635) to allow the user to transmit his or her voice through the electronic device (1600).

The processor (1610) of the electronic device (1600) may connect to a memory (1615). The memory (1615) may be in the form of a computer-readable medium that stores data and, optionally, computer-executable instructions. The electronic device (1600) may also include a communication element (1640) for connection to communication channels (e.g., a cellular telephone network, data transmission network, Wi-Fi network, satellite-phone network, Internet network, Satellite Internet Network, etc.). The communication element (1640) may include an associated wireless transfer element, such as an antenna.

The communication element (1640) may include a subscriber identity module (SIM) in the form of an integrated circuit that stores an international mobile subscriber identity and the related key used to identify and authenticate a subscriber using the electronic device (1600). One or more subscriber identity modules may be removable from the electronic device (1600) or embedded in the electronic device (1600).

The electronic device (1600) may further include a contactless element (1650), which is typically implemented in the form of a semiconductor chip (or other data storage element) with an associated wireless transfer element, such as an antenna. The contactless element (1650) may be associated with (e.g., embedded within) the electronic device (1600) and data or control instructions transmitted via a cellular network may be applied to the contactless element (1650) by means of a contactless element interface (not shown). The contactless element interface may function to permit the exchange of data and/or control instructions between mobile device circuitry (and hence the cellular network) and the contactless element (1650).

The contactless element (1650) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the electronic device (1600) and an interrogation device. Thus, the electronic device (1600) may be capable of communicating and transferring data and/or control instructions via both a cellular network and near field communications capability.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description are in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM) or a read-only memory (ROM). Any such computer-readable medium may also reside on or within a single computational apparatus, and may be present on or within different computational apparatuses within a system or network. Any of the steps, operations, or processes described herein may be performed or implemented with one or more hardware or software modules, alone or in combination with other devices. In one embodiment, a software module is implemented within a computer program product comprising a non-transient computer-readable medium containing computer program code, which can be executed by a computer processor for performing any or all of the steps, operations, or processes described herein.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method for exchanging information about available items performed at a server system, comprising:
  receiving media content relating to an available item from an electronic device of a listing user;
  receiving a textual description of the available item input by a listing user, the textual description including one or more keyword attributes that define attributes of the available item, the keyword attributes forming part of the textual description and being generated by the listing user, wherein the keyword attributes are generated within the textual description by the listing user applying a keyword attribute marker in relation to those keyword attributes;
  receiving location data identifying the location of the available item;
  storing the media content, keyword attributes, and the location data of the available item as an item record in an item database, wherein the item database employs a database structure in which the item records are stored and categorized based on entirely user-generated keyword attributes as marked by the listing users without employing a pre-set or hierarchical classification database structure; and
  responsive to an accessing user accessing the server system using an electronic device, enabling the accessing user to filter item records stored in the item database by the keyword attributes so as to view available items that match the keyword attributes, and enabling the accessing user to filter item records based on a comparison between the location data of the available item and a location of the accessing user so as to indicate the proximity of the available item to the accessing user.

2. The method as claimed in claim 1, wherein receiving location data identifying the location of the available item receives the location as generated by the electronic device of the listing user determining its current location, and the location of the accessing user is determined by the location of the electronic device of the accessing user, and wherein proximity is calculated by the server system and presented to the accessing user as the time it would take the accessing user to travel to the available item.

3. The method as claimed in claim 1, including:
  receiving an item category selected by the listing user; the item category specifying a type of offer made by the listing user;
  storing the item category of the available item as part of the item record in the item database; and
  responsive to the accessing user accessing the server system, enabling the accessing user to filter item records based on the item category.

4. The method as claimed in claim 3, wherein the item category is one of:
  an offer to sell, an offer to rent, an offer to swap, or an offer to give away.

5. The method as claimed in claim 1, including:
  time stamping the item record at or close to the time at which the item record is stored in the item database; and
  responsive to the accessing user accessing the server system, enabling the accessing user to view item records in a chronological manner so that recently stored item records can be viewed first by the accessing user.

6. The method as claimed in claim 1, wherein the media content includes a description of the available item in the form of a string of words describing the available item input by the listing user.

7. The method as claimed in claim 1, wherein, responsive to individual characters of a keyword attribute being sequentially entered by the listing user, prompting the listing user with a dynamic list of keyword attributes previously selected by other listing users with the same starting characters, and enabling the listing user to select one of the keyword attributes previously selected by other listing users, or if none of the keyword attributes previously selected by other listing users are selected, enabling the listing user to create a new keyword attribute.

8. The method as claimed in claim 1 including: receiving a selection of an available item from an accessing user; and enabling the accessing user to comment on the available item, the comment then being associated with the available item and visible to all other accessing users.

9. The method as claimed in claim 1, wherein the media content relating to an available item includes:
  a digital photograph or digital video of an available item.

10. The method as claimed in claim 1, wherein receiving the textual description receives the textual description including the keyword attributes in a single input field.

11. A system for exchanging information about available items, the system comprising a server system having a processor and in communication with electronic devices of a plurality of users, the server system including:
  a receiving module for receiving media content relating to an available item from an electronic device of a listing user, and for receiving a textual description of the available item input by the listing user, the textual description including one or more keyword attributes that define attributes of the available item, the keyword attributes forming part of the textual description and being generated by the listing user and generated within the textual description by the listing user applying a keyword attribute marker in relation to those keyword attributes;

a location module for receiving location data identifying the location of the available item;

an item database module for storing the media content, keyword attributes, and location data of the available item as an item record, wherein the item database module employs a database structure in which the item records are stored and categorized based on entirely user-generated keyword attributes as marked by the listing users without employing a pre-set or hierarchical classification database structure;

an accessing module for enabling an accessing user to access the server system using an electronic device; and a filtering module for enabling the accessing user to filter item records stored in the item database by the keyword attributes and/or location data so as to view available items that match the keyword attributes.

12. The system as claimed in claim 11, wherein the location module for receiving location data identifying the location of the available item receives the location as generated by the electronic device of the listing user determining its current location, and the location of the accessing user is determined by the location of the electronic device of the accessing user, and wherein proximity is calculated by the server system and presented to the accessing user as the time it would take the accessing user to travel to the available item.

13. The system as claimed in claim 11, including:

a category component for receiving an item category selected by the listing user; the item category specifying a type of offer made by the listing user, wherein the item category of the available item is stored as part of the item record in the item database module; and wherein the filtering module, responsive to the accessing user accessing the server system, enables the accessing user to filter item records based on the item category.

14. The system as claimed in claim 13, wherein the item category is one of: an offer to sell, an offer to rent, an offer to swap, or an offer to give away.

15. The system as claimed in claim 11, wherein the item data module includes time stamping the item record at or close to the time at which the item record is stored in the item database; and wherein the accessing module, responsive to the accessing user accessing the server system, enables the accessing user to view item records in a chronological manner so that recently stored item records can be viewed first by the accessing user.

16. The system as claimed in claim 11, wherein the media content includes a description of the available item in the form of a string of words describing the available item input by the listing user; wherein the keyword attributes are selected within the string of words by a specific action performed or input provided by the user in relation to those keyword attributes.

17. The system as claimed in claim 11, including a keyword attribute component for, responsive to individual characters of a keyword attribute being sequentially entered by the listing user, prompting the listing user with a dynamic list of keyword attributes previously selected by other listing users with the same starting characters, and enabling the listing user to select one of the keyword attributes previously selected by other listing users, or if none of the keyword attributes previously selected by other listing users are selected, enabling the listing user to create a new keyword attribute.

18. The system as claimed in claim 11 including an item record selecting component for receiving a selection of an available item from an accessing user; and enabling the accessing user to comment on the available item, the comment then being associated with the available item and visible to all other accessing users.

19. The system as claimed in claim 11, wherein the media content relating to an available item includes a digital photograph or digital video of an available item.

20. A computer program product for exchanging information about available items, the computer program product comprising a non-transitory computer-readable medium having stored computer-readable program code for performing the steps of:

receiving media content relating to an available item from an electronic device of a listing user;

receiving a textual description of the available item input by a listing user, the textual description including one or more keyword attributes that define attributes of the available item, the keyword attributes forming part of the textual description and being generated by the listing user, wherein the keyword attributes are generated within the textual description by the listing user applying a keyword attribute marker in relation to those keyword attributes;

receiving location data identifying the location of the available item;

storing the media content, keyword attributes, and the location data of the available item as an item record in an item database, wherein the item database employs a database structure in which the item records are stored and categorized based on entirely user-generated keyword attributes as marked by the listing users without employing a pre-set or hierarchical classification database structure; and responsive to an accessing user accessing the server system using an electronic device, enabling the accessing user to filter item records stored in the item database by the keyword attributes so as to view available items that match the keyword attributes, and enabling the accessing user to filter item records based on a comparison between the location data of the available item and a location of the accessing user so as to indicate the proximity of the available item to the accessing user.

* * * * *